United States Patent

Acker et al.

[11] Patent Number: 6,145,642
[45] Date of Patent: Nov. 14, 2000

[54] FRICTION CLUTCH WITH AUTOMATIC COMPENSATION FOR WEAR

[75] Inventors: Chistophe Acker, Hagenau, France; Rolf Meinhard, Bühl, Germany

[73] Assignee: Luk Lamellen und Kupplungsbau GmbH, Buhl, Germany

[21] Appl. No.: 09/268,004

[22] Filed: Mar. 15, 1999

[30] Foreign Application Priority Data

Mar. 19, 1998 [DE] Germany ............................ 198 11 937

[51] Int. Cl.[7] ...................................................... F16D 13/75
[52] U.S. Cl. .................................. 192/70.25; 192/89.25; 192/111 A
[58] Field of Search ............................... 192/70.25, 70.27, 192/89.23, 89.25, 111 A; 267/161, 162, 163, 181

[56] References Cited

U.S. PATENT DOCUMENTS

| | | |
|---|---|---|
| 5,409,091 | 4/1995 | Reik et al. . |
| 5,450,934 | 9/1995 | Maucher . |
| 5,628,389 | 5/1997 | Wittmann et al. . |
| 5,632,365 | 5/1997 | Maucher . |
| 5,634,541 | 6/1997 | Maucher . |
| 5,645,153 | 7/1997 | Weidinger et al. ................. 192/70.25 |
| 5,803,224 | 9/1998 | Kimmig et al. . |

FOREIGN PATENT DOCUMENTS 197 54 537  12/1997  Germany .

*Primary Examiner*—Richard M. Lorence
*Attorney, Agent, or Firm*—Darby & Darby

[57] ABSTRACT

A friction clutch for use in the power train of a motor vehicle has a diaphragm spring which, when the clutch is engaged, reacts against the rear wall of the housing and urges the axially movable pressure plate against the friction linings of the clutch disc so that the latter can receive torque from an engine-driven fly-wheel. The wear at least upon the friction linings of the clutch disc is automatically compensated for at requisite intervals by a unit which employs a first set of ramps on the rear wall of the housing and a second set of ramps on an annular element which is installed between the rear wall of the housing and the diaphragm spring, or directly on the diaphragm spring. The latter can be provided with resilient tongues which bear against the outer side of the rear wall of the housing and bias the diaphragm spring against the annular element or, in the absence of such element, directly against those ramps of the wear compensating unit which are provided on the rear wall.

25 Claims, 9 Drawing Sheets

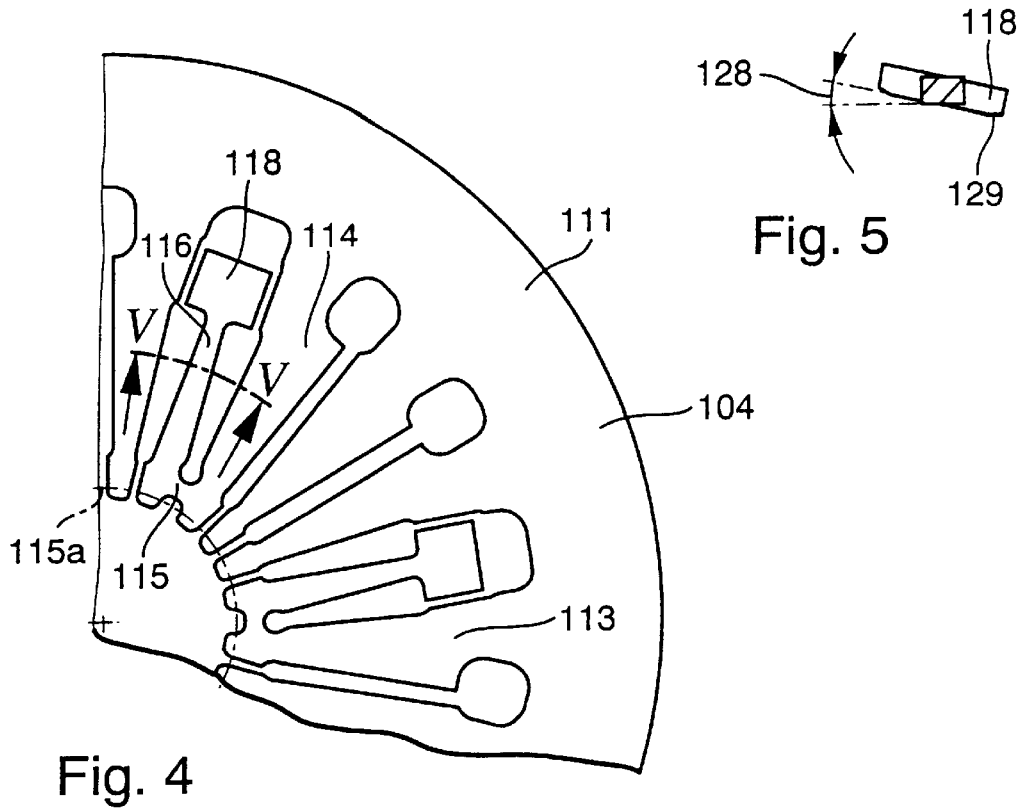
Fig. 4
Fig. 5
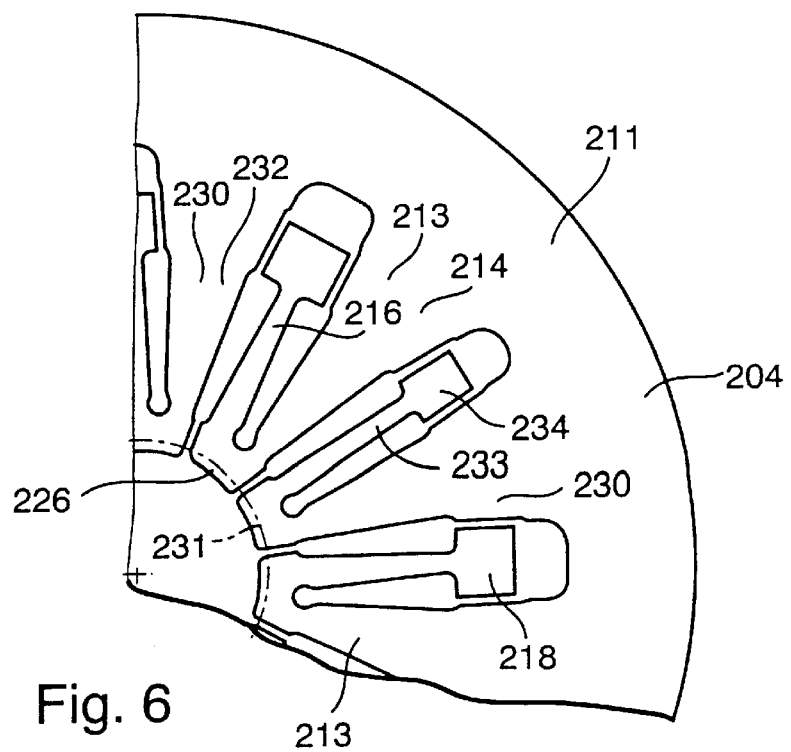
Fig. 6

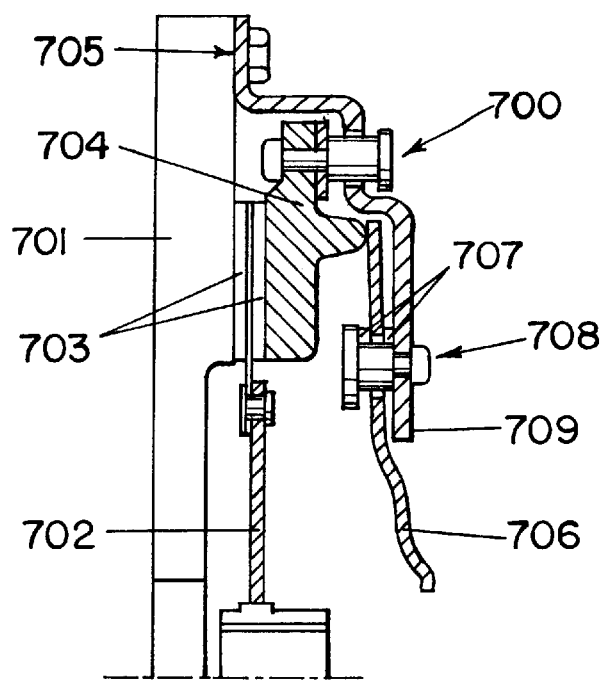
Fig. 15
Prior Art
Fig. 16
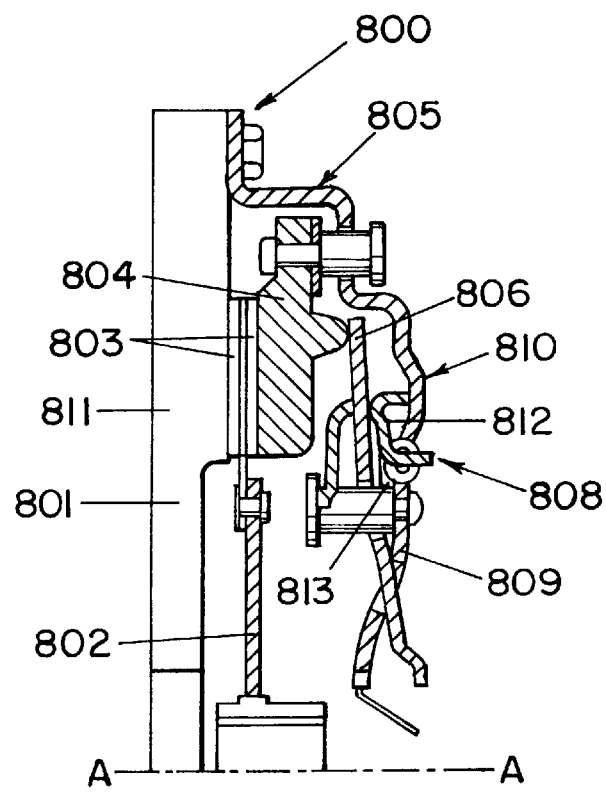
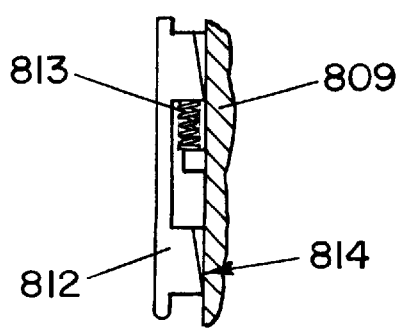
Fig. 17

FRICTION CLUTCH WITH AUTOMATIC COMPENSATION FOR WEAR

BACKGROUND OF THE INVENTION

The invention relates to improvements in friction clutches in general, and more particularly to improvements in friction clutches for use in the power trains of motor vehicles. Still more particularly, the invention relates to improvements in friction clutches of the type equipped with means for compensating for wear upon the friction surface of the pressure plate and/or counterpressure plate, upon the means for biasing the pressure plate against the adjacent friction linings of the clutch disc but at least upon the friction linings of the clutch disc. The wear upon the friction linings of the clutch disc is especially pronounced when the friction clutch is at least partially engaged, i.e., when the friction linings of the clutch disc are free to slide relative to the adjacent friction surfaces of the pressure plate and of the counterpressure plate. The latter can constitute a single flywheel or a composite flywheel which normally receives torque from the rotary output element of a prime mover, e.g., from the crankshaft or camshaft of the internal combustion engine in the power train of a motor vehicle.

The pressure plate in a friction clutch of the above outlined character is normally rotatable with, disposed in and movable within limits axially of the housing of the friction clutch. The housing is normally rotated by the output element of the prime mover, and the pressure plate is acted upon by the aforementioned biasing means which normally includes at least one diaphragm spring arranged to react against the rear wall of the housing or against an annuar seat on such rear wall and to urge the pressure plate axially toward the clutch disc.

The means for compensating for wear, at least upon the friction linings of the clutch disc, can comprise two annular arrays of complementary ramps which operate between the rear wall of the housing and the diaphragm spring (either directly or by way of the aforementioned seat) and means for turning one array of ramps relative to the ramps of the other array to an extent which is necessary to move the pressure plate and the diaphragm spring toward the counterpressure plate through a distance which is necessary to compensate for wear upon the friction linings alone or upon the friction linings and at least one additional part such as the friction surface of the pressure plate, the friction surface of the counterpressure plate, those surfaces of the diaphragm spring which come into contact with neighboring parts, and/or others. The purpose of adjustment or compensation for wear is to ensure that, when the friction clutch is engaged, the bias of the diaphragm spring upon the pressure plate remains at least substantially unchanged during the entire useful life of the friction clutch. In other words, the conicity of the diaphragm spring in the engaged condition of the friction clutch is to remain at least substantially unchanged, regardless of the extent of wear at least upon the friction linings of the clutch disc. By the same token, the force which is required to disengage such friction clutch, too, can remain at least substantially constant during the useful life of the friction clutch; this contributes significantly to convenience of operation or manipulation of the motor vehicle.

Automatically adjustable friction clutches which embody the aforediscussed wear compensation feature have been found to be highly useful in the power trains of motor vehicles and enjoy a widespread use. An advantage of such friction clutches is the convenience of engagement and disengagement during the entire useful life. In addition, such friction clutches contribute to a significant reduction of the maintenance and repair cost of the power train in a motor vehicle. Still further, it has been discovered that, even though the initial cost of a friction clutch with an automatic compensation for wear (especially upon the friction linings forming part of the clutch disc) is evidently higher than that of a standard friction clutch without a wear compensation feature, one can even achieve noticeable savings for the combined cost of the automatically adjustable friction clutch and the clutch engaging/disengaging means, e.g., by rendering it possible to dispose with a servo amplifier, by reducing the space requirements of the friction clutch, and/or by reducing the number of various versions of friction clutches and the engaging/disengaging means therefor.

Friction clutches with automated compensation for wear upon the friction linings of the clutch disc are disclosed, for example, in commonly owned published German patent applications Ser. Nos. 42 39 291, 43 06 505, 42 39 289, 195 24 827 and 197 07 785. The disclosures of all U.S. and foreign patents and patent applications identified in this specification by patent number, serial number and/or otherwise are to be interpreted as having been incorporated herein by reference. This applies also for the disclosure of our German priority patent application Ser. No. 198 11 937.2 filed Mar. 19, 1998.

Friction clutches of the type to which the present invention pertains are further disclosed in commonly owned U.S. Pat. No. 5,628,389 (which corresponds to the aforementioned commonly owned published German patent application Ser. No. 195 24 827) and in the corresponding published French patent application Ser. No. 2 723 992. In such friction clutches, a compensation for wear (particularly upon the friction linings of the clutch disc) necessitates an axial shifting of the diaphragm spring relative to the housing of the friction clutch.

In a conventional friction clutch, the magnitude of the clutch engaging force ($F_A$) must be increased in response to increasing wear upon the friction linings of the clutch disc. The clutch engaging force need not be increased if the friction clutch is equipped with means to compensate for wear at least upon the friction linings of the clutch disc. In many instances, the wear compensating means is designed to compensate for wear upon certain additional parts of the friction clutch, such as the friction surface of the pressure plate and/or the friction surface of the counterpressure plate, the wear upon the diaphragm spring, the wear upon the parts of the seat for the diaphragm spring and/or others.

The friction linings of a clutch disc or clutch plate for use between the pressure plate and the counterpressure plate of a friction clutch can be mounted directly on the radially outermost portion of a washer-like carrier forming part of the clutch disc, or at opposite sides of a set of resilient segments which are carried by the aforementioned washer-like carrier of the clutch disc. Reference may be had to commonly owned U.S. Pat. No. 5,632,365.

Friction clutches wherein the means for compensating for wear upon the friction linings of the clutch disc operate between the rear wall and/or another part of the housing of the friction clutch and the diaphragm spring are disclosed, for example, in commonly owned U.S. Pat. No. 5,409,091 (granted to Wolfgang Reik et al.) and U.S. Pat. No. 5,450,934 (granted to Paul Maucher).

OBJECTS OF THE INVENTION

An object of the invention is to provide a friction clutch which embodies a wear compensating arrangement but is simpler, more compact and less expensive than, and at least as reliable and long-lasting as, heretofore known friction clutches of such character.

Another object of the invention is to provide a friction clutch which embodies the aforesaid wear compensating feature but can be assembled in a simpler and less expensive manner and within a shorter interval of time than heretofore known friction clutches of such general character.

A further object of the invention is to provide a friction clutch which exhibits the aforediscussed wear compensating feature and achieves the desirable compensation for wear with fewer component parts, with simpler component parts and with less expensive component parts, at least a substantial number of which can be mass-produced in available machinery, than heretofore known friction clutches of such character.

An additional object of the invention is to provide a novel and improved diaphragm spring (also called Belleville spring) for use in the above outlined friction clutch.

Still another object of the invention is to provide a novel and improved clutch housing—diaphragm spring combination for use in the above outlined friction clutch.

A further object of the invention is to provide a novel and improved method of simplifying the design of a wear compensating system or assembly for use in a friction clutch of the above outlined character, particularly in a friction clutch which forms part of the power train in a motor vehicle.

Another object of the invention is to provide a novel and improved arrangement for engaging and disengaging the above outlined improved friction clutch which embodies means for compensating for wear at least upon the friction linings of the clutch disc or clutch plate.

An additional object of the invention is to provide a power train which can be utilized in a motor vehicle and embodies a friction clutch of the above out-lined character.

Still another object of the invention is to provide a friction clutch wherein the diaphragm spring performs one or more functions which cannot be accomplished or carried out by diaphragm springs of heretofore known friction clutches embodying or cooperating with means for compensating for wear upon the friction linings of the clutch disc.

A further object of the invention is to provide a friction clutch which can be utilized as a simpler, safer, more compact, more reliable, less expensive and longer-lasting substitute for heretofore known friction clutches with wear compensating means which are utilized in various types, makes and categories of motor vehicles, such as trucks, vans, passenger cars and/or others.

Another object of the invention is to provide novel and improved combinations of pairs of complementary wedges, ramps or slides for use in the wear compensating means of the above outlined character.

An additional object of the invention is to provide the diaphragm spring of the above outlined friction clutch with novel and improved means for facilitating reliable, predictable, convenient and unchanging engagement and/or disengagement of the friction clutch.

Still another object of the invention is to provide a friction clutch which can be utilized in the power train of a motor vehicle and which is constructed, assembled and installed in the power train in such a way that the magnitude of the force which is required to actuate (engage and/or disengage) the clutch remains at least substantially unchanged during the entire useful life of the friction clutch.

A further object of the invention is to provide a novel and improved method of converting sheet metal blanks into diaphragm springs or Bellevile springs which are particularly adapted for use in friction clutch—wear compensating unit combinations, e.g., between the internal combustion engines and change-speed transmissions in the power trains of motor vehicles.

SUMMARY OF THE INVENTION

One feature of the instant invention resides in the provision of a friction clutch which is subject to wear, which is intended for use in a power train and which comprises a housing or casing having a wall and being rotatable about a predetermined axis, a pressure plate which is disposed in, which is rotatable with and which has limited freedom of axial movement in the housing, and at least one diaphragm spring or Belleville spring (hereinafter called diaphragm spring) which is disposed in the housing between the aforementioned wall and the pressure plate, and which is arranged to bias the pressure plate axially of the housing and away from the wall with a force that tends to vary as a function of the extent of wear upon the friction clutch. The at least one diaphragm spring includes an annular portion (also called main portion) which is spaced apart from the predetermined axis, and resilient prongs extending from the annular portion toward the predetermined axis, and the improved friction clutch further comprises means for compensating for wear upon the friction clutch by maintaining the aforementioned force at an at least substantially constant value. The compensating means includes means for biasing the at least one diaphragm spring in the direction of the predetermined axis from the wall toward the pressure plate, and the biasing means includes a substantially annular array of first wedges or ramps or slopes (hereinafter called ramps) carried by and extending in a circumferential direction of the housing, and a substantially annular array of second ramps each cooperating with at least one of the first ramps and including portions forming part of the at least one diaphragm spring.

The aforementioned portions of the second ramps extend or can extend at least substantially axially of the housing of the friction clutch. Such portions of the second ramps can be disposed at least close to the radially innermost marginal part or zone of the main portion of the diaphragm spring.

The prongs of the diaphragm spring can be distributed in such a way that they include pairs of neighboring prongs and the aforementioned portions of the second ramps can be disposed at such pairs of neighboring prongs. The portions of the second prongs can be disposed between the prongs of the respective pairs, as seen in the circumferential direction of the housing.

The at least one diaphragm spring has slots between the prongs, and at least some of such slots have radially inner portions nearer to the predetermined axis and enlarged radially outer portions more distant from such axis. In this friction clutch, the portion of each second ramp is adjacent the enlarged radially outer portion of a discrete slot and the annular main portion of the diaphragm spring is preferably located in a plane which is at least substantially normal to the predetermined axis. In accordance with a presently preferred embodiment of the invention, the portions of the second ramps constitute deformed parts of the at least one diaphragm spring and are bent out of the plane of the main portion to extend at least substantially in the direction of the predetermined axis. Such portions of the second ramps can extend substantially tangentially of the main portion adjacent the enlarged radially outer portions of the respective slots or substantially radially of the main portion adjacent the sides of the enlarged radially outer portions of the respective slots.

The first ramps are provided with a first set of surfaces, and the second ramps have a second set of surfaces abutting the respective surfaces of the first set. At least one surface of each pair of surfaces including a surface of the first set and the respective surface of the second set is an uneven surface; this can be accomplished by providing the uneven surfaces with grooves, ribs, randomly distributed regular or irregular projections and/or in any other suitable way.

The improved friction clutch can further comprise means for urging the second ramps against the respective first ramps, and such urging means can comprise stressed resilient tongues forming part of the at least one diaphragm spring and reacting against the housing. The main portion of the at least one diaphragm spring is normally resilient and the tongues can include first portions extending from the main portion toward the predetermined axis, second portions extending in a direction from such axis toward the main portion, and third portions connecting the first and second portions of the respective tongues and being spaced apart from the main portion. The first and second portions of the tongues can include ends which are adjacent to but spaced apart from the predetermined axis, and the third portions of the tongues can be of one piece with such ends of the first and second portions of the respective tongues.

The tongues can resemble hairpins.

The actuating means of or for the friction clutch (i.e., the means for engaging and disengaging the clutch) can include the resilient prongs and/or the resilient tongues. The tongues, as well as the prongs, normally extend from the annular main portion of the at least one diaphragm spring toward the predetermined axis.

As is customary in connection with operation of friction clutches, the pressure plate is engageable with and disengageable from a clutch disc. The prongs of the diaphragm spring can be stressed and can react against the housing and can extend from the radially inner marginal portion or zone of the main portion of the at least one diaphragm spring. Such diaphragm spring can further comprise the aforementioned hairpin-shaped tongues which extend from the radially inner marginal zone of the main portion and react against the housing, e.g., only during disengagement of the pressure plate from the clutch disc. The clutch disengaging means can comprise means for moving portions of the prongs and/or tongues in the axial direction of the housing and away from the aforementioned wall. This friction clutch can further comprise means for engaging the pressure plate with the clutch disc, and such disengaging means can include the prongs and/or the tongues of the diaphragm spring.

It is possible to design the at least one diaphragm spring in such a way that its prongs resemble hairpins and that its tongues also resemble hairpins which extend radially inwardly from the radially inner marginal zone of the annular main portion.

The annular main portion of the at least one diaphragm spring can be confined in the housing of the friction clutch in a prestressed condition and its radially inner marginal zone is of one piece with the prongs as well as with the aforementioned tongues which can resemble hairpins having pairs of portions extending substantially radially of the annlar main portion. At least some of the prongs can be disposed between the substantially radially extending portions of each of the substantially hairpin-shaped tongues.

Another feature of the invention resides in the provision of a friction clutch which can be utilized in a power train, which is subject to wear, and which comprises a housing having a wall (such as a wall which is remote from the internal combustion engine if the housing is driven by the output element of the engine in the power train) and being rotatable about a predetermined axis, a pressure plate which is disposed in, which is rotatable with and which has a limited freedom of axial movement relative to the housing, and at least one diaphragm spring which is disposed in the housing between the wall and the pressure plate and which is arranged to bias the pressure plate axially of the housing and away from the wall with a force tending to vary as a function of the extent of wear upon the friction clutch. The at least one diaphragm spring includes an energy storing device having an annular portion spaced apart from the predetermined axis, resilient prongs extending from the annular portion toward the predetermined axis, and prestressed hairpin-shaped tongues forming part of the annular portion and arranged to bias the at least one diaphragm spring against the housing. The tongues have pairs of portions which are spaced apart from each other in the circumferential direction of the housing, and at least one of the prongs is disposed between the pairs of spaced-apart portions of the at least some of the tongues. The friction clutch further comprises means for compensating for wear upon the friction clutch by maintaining the aforementioned force at an at least substantially constant value; such compensating means includes means for biasing the at least one diaphragm spring in the direction of the predetermined axis from the wall of the housing toward the pressure plate.

A further feature of the invention resides in the provision of an engageable and disengageable friction clutch which can be utilized in a power train (particularly in the power train of a motor vehicle), which is subject to wear, and which comprises a housing having a wall and being rotatable about a predetermined axis, a pressure plate which is disposed in, which is rotatable with and which has limited freedom of axial movement relative to the housing, and at least one diaphragm spring which is disposed in the housing between the wall and the pressure plate and is arranged to bias the pressure plate axially of the housing and away from the wall with a force that tends to vary as a function of the extent of wear upon the friction clutch. The at least one diaphragm spring includes an annular portion which is spaced apart from the predetermined axis and has a radially inner marginal portion, hairpin-shaped resilient prongs which extend from the annular portion toward the predetermined axis and permanently react against the housing, and prestressed hairpin-shaped tongues forming part of the annular portion, extending from the marginal portion radially inwardly toward the predetermined axis and serving to bias the at least one diaphragm spring against the housing during disengagement of the friction clutch. The friction clutch further comprises means for compensating for wear upon the friction clutch by maintaining the aforementioned variable force at an at least substantially constant value. The means for compensating for wear upon the friction clutch comprises means for biasing the at least one diaphragm spring in the direction of the predetermined axis, and more specifically in a direction from the aforementioned wall of the housing toward the pressure plate.

The novel features which are considered as characteristic of the invention are set forth in particular in the appended claims. The improved friction clutch itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 4 is a fragmentary schematic elevational view of a diaphragm spring constituting a first modification of the diaphragm spring in the friction clutch of FIGS. 1 to 3;

FIG. 5 is a fragmentary sectional view as seen in the direction of arrows from the line V—V in FIG. 4;

FIG. 6 is a view similar to that of FIG. 4 but showing a portion of a third diaphragm spring;

FIG. 15 is a fragmentary axial sectional view of a conventional friction clutch without a wear compensating unit;

FIG. 16 is a similar fragmentary axial sectional view of a friction clutch embodying a known wear compensating unit;

FIG. 17 is a fragmentary sectional view of a detail in the friction clutch of FIG. 16;

DESCRIPTION OF PREFERRED EMBODIMENTS

Figure 1:
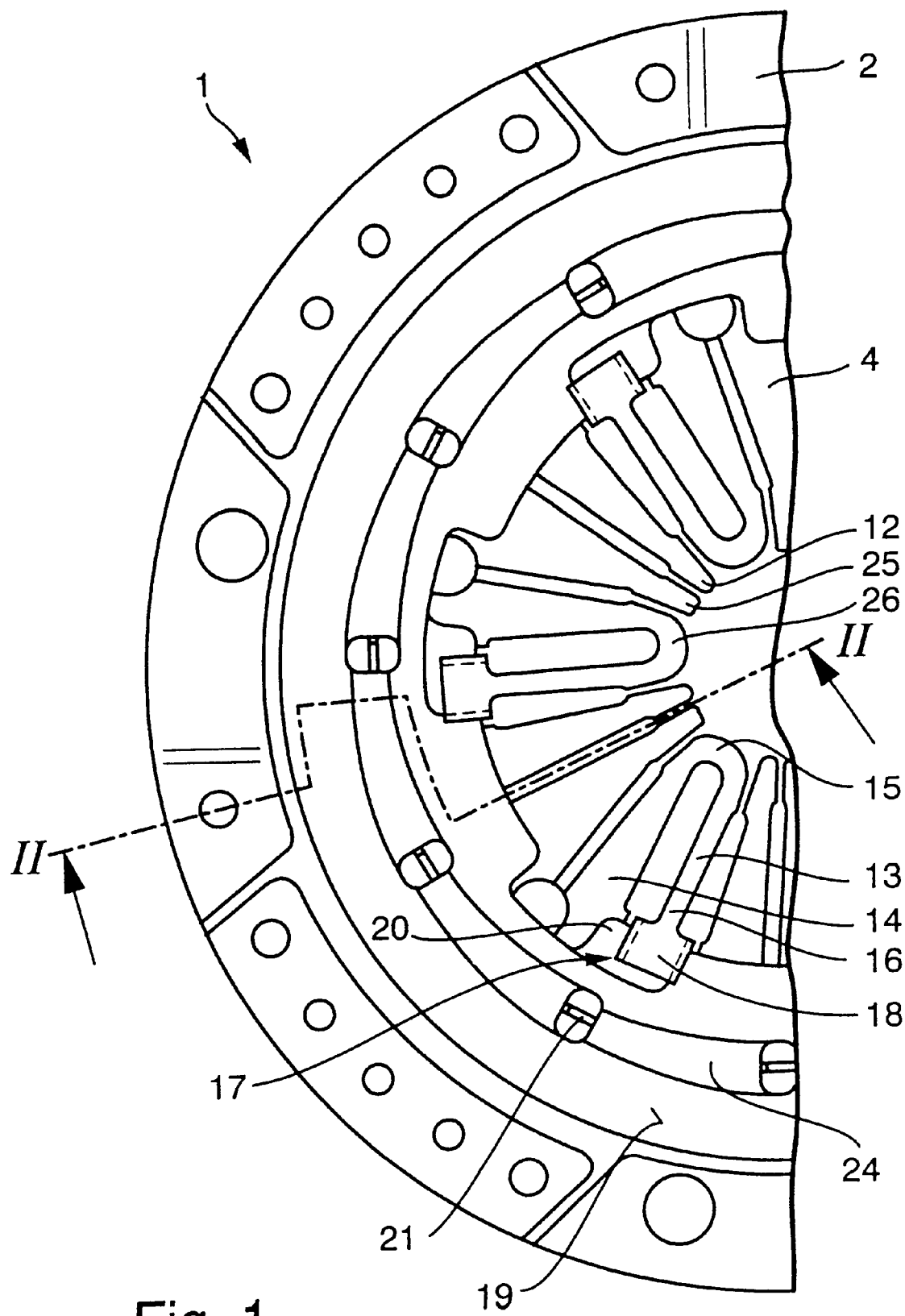
FIG. 1 is a fragmentary schematic elevational view of a friction clutch which embodies one form of the present invention.
Figure 2:
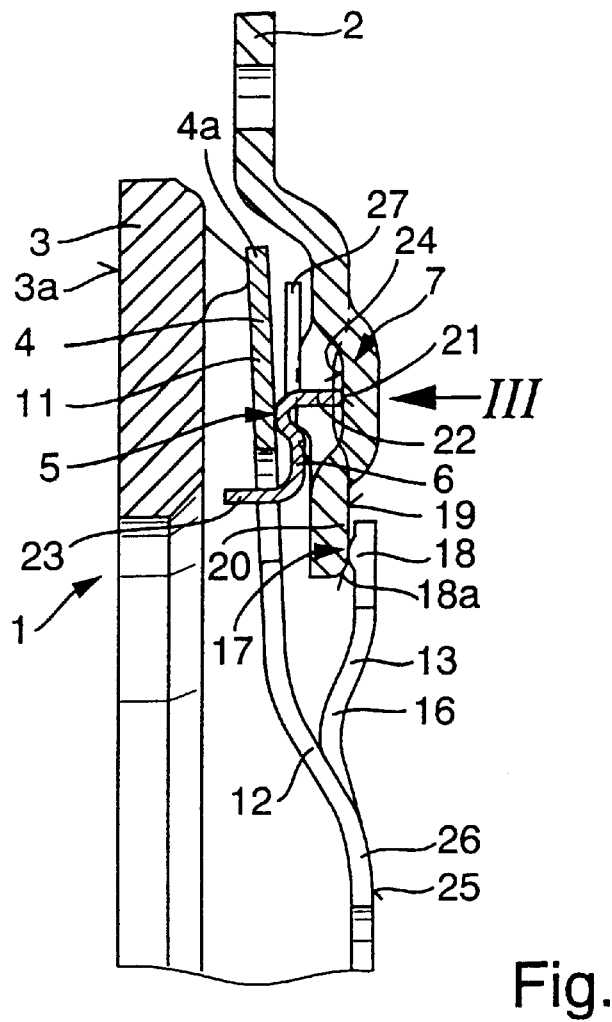
FIG. 2 is a fragmentary sectional view substantially as seen in the direction of arrows from the composite line II—II in FIG. 1.
Figure 3:
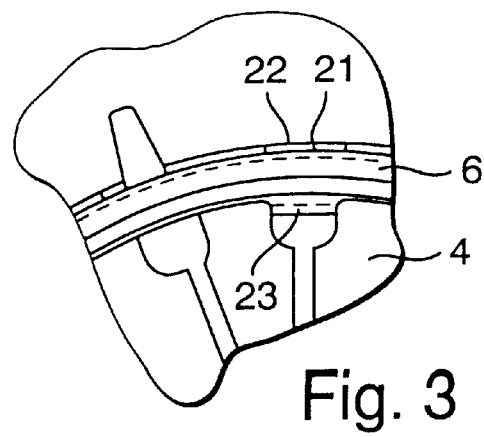
FIG. 3 is a view of a detail as seen in the direction of arrow III in FIG. 2.

FIGS. 1 to 3 show certain component parts of a friction clutch 1 which embodies one form of the present invention.

The clutch 1 comprises a housing 2 which is or which can be made of a metallic sheet material and confines or is adjacent a pressure plate 3 rotatable with the housing about a common axis X—X and movable relative to the housing within limits in the direction of such axis. The means for non-rotatably but axially movably connecting the pressure plate 3 with the housing 2 comprises a set of leaf springs (shown at 9 in FIG. 2 of U.S. Pat. No. 5,450,934) which extend tangentially or circumferentially of the housing and are normally stressed to urge the pressure plate 3 axially of and toward the rear wall 2a of the housing, i.e., away from the customary clutch disc and counterpressure plate of the friction clutch 1.

A counterpressure plate is shown at 6, and a clutch disc (with friction linings 7 which are normally subject to extensive wear in response to repeated engagement and disengagement of the clutch) is shown at 8 in FIG. 2 of the '934 patent. The counterpressure plate is normally driven by the output element (such as a crankshaft or a camshaft) of the engine, and the hub of the clutch disc can transmit torque to the input shaft of a change-speed transmission in the power train which includes the friction clutch (reference may be had again to FIG. 2 of the '934 patent). The housing 2 receives torque from the counterpressure plate (i.e., from the engine) by way of bolts, rivets or other suitable fasteners.

The means for biasing the pressure plate 3 axially of and away from the rear wall 2a of the housing 2 (so that, when the clutch 1 is at least partially engaged, the housing 2, the counterpressure plate and the pressure plate 3 can transmit torque to the clutch disc and hence to the input element of the transmission) comprises a novel and improved diaphragm spring 4.

The diaphragm spring 4 acts as a two-armed lever and, to this end, is tiltable about a fulcrum defined by an annular seat 5 carried by the rear wall 2a of the housing 2. This diaphragm spring comprises an annular radially outer or main portion 11 having a radially innermost part, portion or zone abutting the seat 5 radially inwardly of the locations (4a) of contact between the main portion 11 and the annular array of projections at the adjacent (rear) side of the pressure plate 3. When the diaphragm spring 4 is free to urge the friction surface 3a of the pressure plate 3 against the adjacent set of friction linings on the clutch disc, the other set of friction linings is urged against the friction surface of the counterpressure plate so that the latter can transmit a selected torque to the input element of the transmission. The magnitude of such torque is dependent upon the extent (if any) of frictional slip between the clutch disc on the one hand, and the counterpressure plate and the pressure plate 3 on the other hand.

During assembly of the friction clutch 1, the pressure plate 3 is forced axially into the housing 2 in a direction toward the rear wall 2a so that the diaphragm spring 4 (which at that time already abuts the seat 5) is compelled to store a certain amount of energy and biases the inserted pressure plate 3 in a direction toward the clutch disc and the counterpressure plate. Insertion of the pressure plate 3 into the housing 2 entails a deformation of the diaphragm spring 4 in a sense that the latter assumes (or tends to assume) a frustoconical shape and one side of its annular main portion 11 bears (at 4a) against the projections of the pressure plate 3 while the other side of the main portion 11 bears or reacts against the annular seat 5.

The illustrated seat 5 comprises an annular element 6 which is or which can be made of a metallic sheet material. The annular element 6 constitutes a portion of the seat 5 as well as a component part of a wear compensating device or unit 7 serving to ensure that the force which the diaphragm spring applies to the projections of the pressure plate 3 remains at least substantially unchanged irrespective of the extent of wear upon the friction clutch 1, particularly upon the friction linings of the clutch disc but preferably also upon the friction surface of the counterpressure plate, the friction surface 3a of the pressure plate 3, certain surfaces of the diaphragm spring 4 and the annular element 6.

The mode of operation of the wear compensating unit 7 is such that, during the entire useful life of the friction clutch 1, the diaphragm spring 4 is repeatedly moved axially of the housing 2 and away from the rear wall 2a so that the conicity of the annular main portion 11 of the diaphragm spring remains at least substantially unchanged.

The diaphragm spring 4 further comprises means in the form of resilient tongues or arms 13 (see particularly FIG. 2) which bear against the outer side 19 of the rear wall 2a of the housing 2 and urge the annular main portion 11 of the diaphragm spring 4 against the adjacent side of the annular element 6, i.e., against the seat 5. The mounting and the bias of the tongues 13 upon the rear wall 2a are such that the tongues pull the resilient main portion 11 against the annular element 6.

The tongues 13 are elongated, as seen radially of the axis X—X, and are made of one piece with the diaphragm spring 4, i.e., with the main portion 11, and can be formed at the time a sheet metal blank is being converted into the diaphragm spring 4. As can be seen in FIG. 1, each tongue 13 resembles a hairpin and includes two circuferentially spaced-apart radially inwardly extending elongated portions 14, 16 the radially inner ends of which are of one piece with a third portion 15 nearest to the axis X—X. The portion 14 of each tongue 13 is of one piece with the radially innermost part or zone of the annular main portion 11 and with the respective third portion 15. On the other hand, each radially extending portion 16 has a radially inner end of one piece with the respective third portion 15, and an unattached (free) radially outer end or part 18 at least partially overlying and abutting the adjacent portion 17 of the exposed surface 19 of the rear wall 2a of the housing 2. The end portion 18 and/or the adjacent portion 17 of the exposed surface 19 of the rear wall 2a can have a convex or an analogous configuration (at 18a) which abuts the adjacent surface. Thus, if the surfaces 18a are provided on the parts 18, they abut complementary surfaces or a flat surface at the exposed side 19 of the rear wall 2a.

An advantage of the hairpin-shaped tongues 13 is that they can undergo a large amount of deformation anywhere between the radially outermost parts of their radially extending portions 14 (of one piece with the resilient main portion 11) and the free ends or parts 18 of the respective radially extending portions 16. Otherwise stated, the diaphragm spring 4 can undergo extensive deformation relative to the wall 2a, as seen in the direction of the common axis X—X of the diaphragm spring, pressure plate 3, housing 2, the counterpressure plate and the clutch disc and its friction linings.

The diaphragm spring 4 is installed in the housing 2 in a prestressed condition, i.e., the free ends 18 of the (second) portions of its hairpin-shaped tongues 13 bear against the exposed side 19 of the wall 2a and urge the main portion 11 of the the diaphragm spring against the adjacent side of the annular element 6 forming part of the wear compensating unit 7 as well as of the seat 5.

The housing 2 carries a first annular array or set of wedges or ramps 20 which are provided at the outer or exposed side or surface 19 of the rear wall 2a. The ramps 20 share all angular movements of the housing 2 about the axis X—X and cooperate with the free ends 18 of the tongues 13. FIG. 2 shows that the ramps 20 are of one piece with the rear wall 2a; however, it is equally within the purview of the invention to produce the ramps 20 as separate parts or as a separate annulus of coherent ramps, and to thereupon affix (e.g., weld) the discrete ramps 20 or the annulus of such ramps to the exposed surface 19 of the rear wall 2a. Each ramp 20 constitutes a circumferentially extending and axially sloping member which can permit the diaphragm spring 4 to move axially and away from the rear wall 2a in response to rotation of the housing 2 and the diaphragm spring 4 relative to each other. The extent of angular movability of the diaphragm spring 4, with attendant movement of the free ends 18 along the ramps 20, is sufficient to compensate for wear at least upon the friction linings of the clutch disc during the entire useful life of the friction clutch 1.

For example, the ramps 20 can constitute or comprise suitably sloping portions of the exposed surface 19 at the radially innermost portion of the rear wall 2a.

When the friction clutch 1 is new (i.e., when the wear upon the friction linings of the clutch disc is nil or negligible), the free ends of the radially extending portions 16 of the hairpin-shaped tongues 13 engage those portions of the respective ramps 20 which are located at a maximum axial distance from the pressure plate 3, the counterpressure plate and the clutch disc.

The annular element 6 is part of the wear compensating unit 7 and, to this end, comprises projections or fingers 21 constituting an annular array or set of ramps each of which cooperates with (abuts) one of a further array or set of ramps 24 at the inner side of the rear wall 2a. It is preferred to distribute the ramps 21 as well as the ramps 24 so that they form two annular arrays of equidistant ramps as seen in the circumferential direction of the annular element 6.

The element 6 can constitute an annular stamping or an embossed part and includes projections or lugs 22 which are bent out of its general plane (i.e., from that portion of the element 6 which is located in a plane normal to the axis X—X) and the free edge faces or tips 21 of which contact the ramps 24 at the inner side of the rear wall 2a. As can be seen in FIGS. 2 and 3, the lugs 22 are of one piece with the radially outer portion of the element 6. However, it is equally possible to make the lugs 22 as separate parts which are thereupon bonded and/or otherwise secured to circumferentially spaced-apart portions of the element 6.

The radially inner portion of the annular element 6 is provided with at least one forwardly bent portion 23 which is preferably of one piece therewith and can include several discrete parts (e.g., in the form of teeth) received in the radially extending slot or slots between the neighboring radially inwardly extending prongs 12 of the diaphragm spring 4. A single portion 23 suffices to ensure that the diaphragm spring 4 and the annular element 6 must turn (about the axis X—X) as a unit. However, it is often preferred to employ two, three or more discrete spaced-apart portions 23 which can then perform the additional function of centering the element 6 relative to the diaphragm spring 4 and/or vice versa.

The ramps 21 of the element 6 cooperate with the ramps 24 which, in the embodiment of FIGS. 1 to 3, are provided directly on the housing 2. The angle of slope of the inclined surfaces of each of the ramps 21, 24 can be in the range of between about 6° and 12°, preferably about 8.5°. The magnitude of this angle of slope is selected with a view to ensure that the frictional engagement between the ramps 21, 24 is sufficiently pronounced to prevent any, or any appreciable, undesirable or unnecessary angular movements between the element 6 and the housing 2, i.e., to avoid any unwarranted "compensation" for wear at least upon the friction linings of the aforementioned clutch disc forming part of the fully assembled friction clutch.

Accidental angular displacements of the element 6 and housing 2 relative to each other can be prevented with an even higher degree of reliability by roughening those surfaces of the ramps 21 and/or 24 which contact the surfaces of the complementary ramps. Such roughening can involve the formation of ribs and grooves which extend at least substantially radially of the axis X—X, random roughening of the relevant surfaces of the ramps 21 and/or 24, coating with a substance which opposes sliding movements of the ramps 21, 24 relative to each other, and/or other expedients.

For example, if the surfaces of the ramps 21 and/or 24 are to be provided with substantially radially extending ribs and/or grooves, the height or depth of such ribs and/or grooves can be in the range of between about 0.05 mm and 0.5 mm, preferably between about 0.15 mm and 0.3 mm. The spacing between neighboring ribs or grooves in the relevant surfaces of the ramps 21 and/or 24 can be in the range of between 0.5 and 2 mm, particularly in the range of between about 0.5 and 1 mm. Each groove can have a substantially wedge-shaped cross-sectional outline. It is also possible to impart to the grooved or ribbed surfaces of the ramps 21 and/or 24 an undulate or meandering outline (as seen in the circumferential direction of the annular element 6). Still further, it is possible to provide the active surfaces of the ramps 21 and/or 24 with sawtooth-shaped profiles.

If the grooves, ribs, teeth or analogous configurations are provided on the abutting surfaces of the ramps 21 and 24, this renders it necessary or possible to carry out stepwise angular adjustments of the annular element 6 relative to the housing 2. Thus, the spacing between neighboring ribs, grooves, sawteeth or the like determines the (normally minute) extents of angular displacement of the element 6 relative to the wall 2, i.e., the extent of axial shifting of the diaphragm spring 4 and pressure plate 3 to thus compensate for wear at least upon the friction linings of the clutch disc during the entire useful life of the friction clutch 1.

The diaphragm spring 4 (only one-half of which is shown in FIG. 1) comprises a total of six hairpin-shaped resilient tongues 13 and two radially extending prongs 12 between each pair of neighboring tongues 13. The parts 12, 13 can be formed by suitable severing (e.g., trimming) means during conversion of sheet metal blanks into discrete (finished or partly finished) diaphragm springs 4.

FIG. 2 shows that the orientations of the prongs 12 and hairpin-shaped tongues 13 (as seen radially of the axis X—X) are such that their respective radially innermost portions 25, 26 can form part of the means for engaging and disengaging the friction clutch 1. To this end, the radially inner end portions 25, 26 can be engaged by a customary release bearing (reference may be had to commonly owned U.S. Pat. No. 5,632,365 wherein a clutch release bearing is shown in FIG. 1, as at 30). The radial distance of the end portions 25, 26 from the axis X—X is or can be the same, and these end portions are or can be located in a plane extending at right angles to the axis X—X so that they can be simultaneously engaged by the inner and/or outer race of a disengaging bearing which is moved in the direction of the axis X—X from the right to the left, as viewed in FIG. 2, in order to pivot the diaphragm spring 4 relative to the seat 5 so that the part 4a of the annular main portion 11 of the diaphragm spring is caused to move in a direction to the right and to thus enable the aforementioned leaf springs to lift the friction surface 3a of the pressure plate 3 off the adjacent friction linings of the clutch disc.

All other details regarding the mode of operation of the wear compensating unit 7 are or can be identical with those described in the aforementioned U.S. Pat. No. 5,628,389, the corresponding published German patent application Ser. No. 195 24 827 and the corresponding French patent application Ser. No. 27 23 992.

FIGS. 1 to 3 show that the wear compensating unit 7 further comprises elements 27 in the form of lugs which extend radially outwardly from the annular element 6. The lugs 27 cooperate with the diaphragm spring 4 during actuation of the friction clutch 1. The axial positions of the lugs 27 relative to the adjacent portions of the diaphragm spring 4 are such that, when the spring 4 has exceeded a certain disengaging (tilting) movement relative to the seat 5 (by pivoting in a clockwise direction, as viewed in FIG. 1), the main portion 11 of the spring 4 abuts the lugs 27. This preferably takes place when a predetermined (required and optimal) clutch disengaging movement of the diaphragm spring has just been completed or is about to be completed or is being completed. The just discussed engagement of the lugs 27 by the diaphragm spring 4 ensures that no further compensation for wear can take place once the disengagement of the friction clutch 1 is completed. In other words, an excessive tilting of the diaphragm spring 4 cannot result in excessive "compensation" for wear at least upon the friction linings of the clutch disc. This is accomplished by the simple expedient of preventing further operation of the engine from influencing the extent (and hence the quality) of the wear compensating action.

In many instances, it suffices to provide three lugs 27 which can be uniformly distributed about the axis X—X of the housing 2.

The ramps 24 can be maintained in a mere point, linear or relatively large or relatively small surface-to-surface contact with the ramps 21. In other words, it is within the purview of the invention to provide the ramps 21 or 24 with surfaces which extend in the circumferential direction of the annular element 6 and slope in the direction of the axis X—X, and to design the complementary ramps 24 or 21 in such a way that they merely constitute pin-shaped or analogous followers which track the fully defined or developed circumferentially extending and axially sloping ramps.

The resilient energy storing means (see the coil spring 813 in FIG. 17) and the sensor means (see the diaphragm spring 811 in FIG. 16) have been omitted in FIGS. 1 to 3 for the sake of clarity. Reference may be had to U.S. Pat. No. 5,450,934.

As will be described with reference to FIGS. 9 to 14, the annular element 6 or its equivalent can be omitted by employing a diaphragm spring which is provided with a set of ramps, i.e., which forms part of the wear compensating unit.

FIG. 15 illustrates certain parts of a conventional friction clutch 700 which is not provided with a wear compensating unit. This friction clutch employs an engine-driven counterpressure plate or flywheel 701, a clutch disc 702 having two sets of friction linings 703 located between the annular friction surface of the counterpressure plate 701 and an axially movable pressure plate 704, a housing 705 which is attached to the counterpressure plate 701, and a diaphragm spring 706 tiltably mounted between two wire rings 707 of a seat 708 carried by the rear wall 709 of the housing 705. The conicity (and hence the bias) of the diaphragm spring 706 changes as the wear upon the friction linings 703 increases, i.e., as the thickness of the friction linings decreases.

FIG. 16 shows certain details of a self-adjusting clutch 800 with a counterpressure plate 801, a clutch disc 802 having friction linings 803, a pressure plate 804, a housing 805 having a rear wall 809, a diaphragm spring 806, and a seat 808 tiltably mounting the diaphragm spring 806 on the rear wall 809. A wear compensating unit 810 comprises a sensor 811 (such as a diaphragm spring) which biases the diaphragm spring 806 against an annular adjusting member 812 forming part of the unit 810 and mounted on the rear wall 809 for rotation about the axis A—A. The means for biasing the adjusting member 812 in the circumferential direction of the rear wall 809 comprises a set of (e.g., three equidistant) coil springs 813 (one shown in FIG. 17) which react against the rear wall 809. The rear wall 809 and the adjusting member 812 are provided with sets of cooperating ramps 813 which cause the member 812 and the diaphragm spring 806 to move axially of the housing 805 when the extent of wear upon the friction linings 803 reaches or again reaches a predetermined value detected by the sensor 811.

Figure 18:
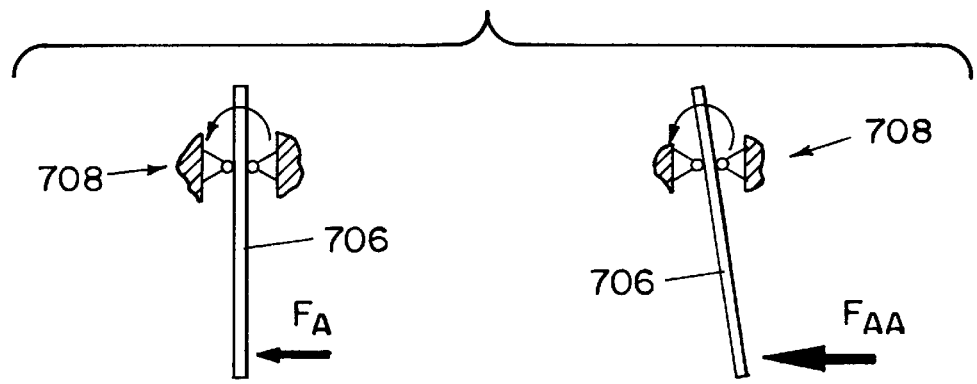
FIG. 18 illustrates two positions of the diaphragm spring in the conventional friction clutch of FIG. 15.

The left-hand portion of FIG. 18 shows the inclination or conicity of the diaphragm spring 706 when the wear upon the friction linings 703 is nil, i.e., when the conventional friction clutch 700 is new. In order to disengage the clutch 700 while the thickness of the friction linings 703 is still at a maximum value, it is necessary to tilt the diaphragm spring 706 in response to the application of a relatively small force $F_A$.

The right-hand portion of FIG. 18 shows the inclination or conicity of the diaphragm spring 706 after the friction linings 703 have undergone a pronounced (e.g., maximum permissible) wear. In order to disengage the clutch 700, with the diaphragm spring 706 inclined in a manner as shown in the right-hand portion of FIG. 18, it is necessary to exert a greater force $F_{AA}$.

Figure 19:
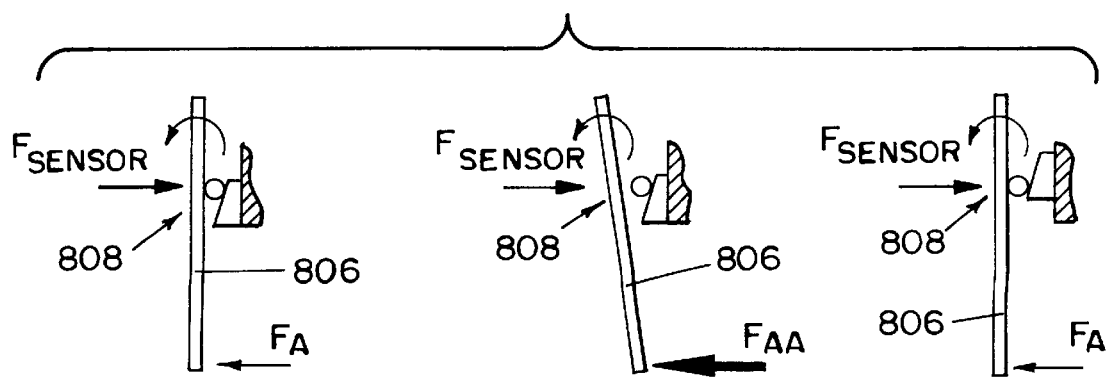
FIG. 19 illustrates three positions of the diaphragm spring in the friction clutch which is shown in FIG. 16.

The left-hand portion of FIG. 19 shows the orientation of the diaphragm spring 806 when the friction linings 803 of the clutch disc 802 in the friction clutch 800 of FIG. 16 are still intact or upon completion of an adjustment to compensate for wear upon the friction linings 803. A tilting of the diaphragm spring 806 at the seat 808 in order to disengage the friction clutch 800 necessitates the application of a relatively small force shown at $F_A$.

Once the friction linings 803 have undergone a certain amount of wear, the diaphragm spring 806 assumes a conicity as shown (exaggerated) in the central portion of FIG. 19. In order to disengage the clutch 800, it would be necessary to apply a force $F_{AA}$ greater than the force $F_A$. However, and since the friction clutch 800 embodies the wear compensating unit 810, the inclination or conicity of the diaphragm spring 806 is not permitted to depart (or to considerably depart) from that shown in the right-hand portion of FIG. 19, i.e., the clutch 800 can be disengaged in response to the application of a relatively small force $F_A$ which matches or at least approximates the force required to disengage a clutch 800 having intact friction linings 803. This is accomplished in that, in the clutch 800 (as well as in the friction clutch 1 of FIGS. 1 to 3), the wear compensating unit (810 in FIG. 16 and 7 in FIG. 2) compels the diaphragm spring to change its axial position again and again in order to ensure that the conicity of the diaphragm spring need not change in response to progressing wear upon the friction linings of the clutch (802 in FIG. 16, located to the left of the pressure plate 3 in the friction clutch 1 of FIG. 2).

In the conventional friction clutch 700 of FIG. 15, the axial position of that portion of the diaphragm spring 706 which is confined between the wire rings 707 of the seat 708 cannot change; therefore, the conicity of the diaphragm spring 706 increases in response to progressing wear upon the friction linings 703 (reference can be had again to FIG. 18).

The bias of the sensor 811 in the wear compensating unit 810 of FIG. 16 is normally selected in such a way that the sensor can withstand the force $F_A$ being applied to the radially innermost portions of prongs forming part of the diaphragm spring 806 and extending radially inwardly (toward the axis A—A) from the circumferentially complete annular radially outer (main) portion of the spring 806. The effective resistance of the sensor 811 to a tilting of the diaphragm spring 806 toward the orientation shown in the central portion of FIG. 19 decreases when the thickness of the friction linings 803 decreases in response to progressing wear (because the pressure plate 804 offers a lesser resistance to tilting of the spring 806), and this enables the coil springs 813 of the wear compensating unit 810 to change the angular position of the annular adjusting member 812 whereby the ramps of the member 812 slide along the ramps of the rear wall 809 and shift the member 812 (and hence the diaphragm spring 806) toward the counterpressure plate 801. Compensation for wear upon the friction linings 803 is terminated or interrupted in automatic response to completion of an axial movement which enables the sensor 811 to again withstand rotation of the adjusting member 812 under the bias of the coil springs 813. This takes place when the conicity (and hence the bias) of the diaphragm spring 806 again matches the conicity at the time when the friction linings 803 were still intact (compare the conicities of the diaphragm spring 806 in the left-hand and right-hand portions of FIG. 19).

The differences between the magnitudes of the forces $F_A$ and $F_{AA}$ shown in FIG. 18 can be quite pronounced and are attributable to the characteristics of a diaphragm spring. Elimination of the need for the application of increasing clutch disengaging forces in response to progressing wear upon the friction linings of the clutch disc is highly desirable, and this explains the popularity of friction clutches which embody the wear compensating feature. This is accomplished with the expedient of rotating the diaphragm spring (806, 4) with controlled freedom of movement in the direction of the axis of the clutch housing.

FIG. 4 shows a portion of a diaphragm spring 104 wherein the (third) portions 115 extending between the radially oriented (first and second) portions 114, 116 of the hairpin-shaped tongues 113 are not rounded (convex) but exhibit an undulate (hill-and-valley type) configuration. The portions 115 form part of the clutch disengaging means in that they cause the diaphragm spring 104 to change its conicity and to permit the pressure plate (not shown in FIG. 4) to become disengaged from the adjacent friction linings of the clutch disc when depressed (in the axial direction of the friction clutch) by a suitable clutch disengaging component, e.g., by a disengaging bearing the outline of which is shown in FIG. 4 by a portion of a phantom-line circle 115a. The undulate outline of the portion 115 of each tongue 113 reduces the area of contact with the disengaging bearing but does not affect the reliability of the tilting action upon the tongues 113.

FIG. 5 shows that the free ends 118 (i.e., the radially outermost parts) of the (second) portions 116 of the tongues 113 are configured in such a way that their lateral portions 129 (as seen in the circumferential direction of the annular main portion 111 of the diaphragm spring 104) are inclined or twisted relative to the central portion 129a. The extent of twisting (chamfer) relative to the portion 129a is shown at 128 and amounts to a relatively small acute angle, e.g., within the range of between about 6° and 12°, particularly about 8.5°. This angle can approximate or match the slope of the ramps forming part of the wear compensating unit in the friction clutch employing the diaphragm spring 104 of FIG. 4. However, it is also possible to resort to an angle 128 which is greater or less than the angle of slope of the ramps in the respective wear compensating unit. The just discussed twisting of the free ends 118 is desirable and advantageous because such free ends are more likely to accurately conform to the configuration of adjacent portions of the exposed surface of the rear wall of the housing which is engaged by the free ends 118 in actual use of the diaphragm spring 104 (see the positions of the free ends 18 with reference to the exposed surface 19 of the rear wall 2a of the housing 2 in the friction clutch 1 shown in FIGS. 1 and 2).

The pronounced resiliency of the tongues 113 (due to their resemblance to hairpins) enables the free ends 118, and particularly their twisted lateral portions 129, to readily follow the outlines of adjacent portions of the external surface of the rear wall of the housing forming part of the friction clutch which employs a diaphragm spring (104) of the type shown in FIG. 4. The prongs 112 of the diaphragm spring 104 are functional equivalents of the aforediscussed prongs 12 shown in FIGS. 1 and 2.

The twisting of lateral portions 129 of the free ends 118 can take place during making of the diaphragm spring 104, e.g., in a stamping or embossing machine. It has been found that such twisting of the portions 129 greatly reduces the likelihood of unpredictable angular displacements of the diaphragm spring 104 relative to the clutch housing when the turning of the diaphragm spring is being effected in order to compensate (initially or again) for wear at least upon the friction linings of the clutch disc. Moreover, the free ends 118 are less likely to scratch the exposed surface of the rear wall of the clutch housing (or to be scratched by such rear face) during angular adjustment of the diaphragm spring 104 in order to compensate for wear. Thus, the novel configuration of the free ends 118 contributes to longer useful life of the friction clutch and to reliability and predictability of each wear compensating operation.

It is clear that the just discussed feature (special configuration of the free ends of substantially hairpin-shaped or otherwise configured tongues or prongs) can be resorted to with equal or similar advantage in connection with the making and shaping of the diaphragm spring 4 and/or the diaphragm springs to be described with reference to FIGS. 6 to 14.

The diaphragm spring 204 of FIG. 6 comprises an energy storing part constituted by or including the circumferentialy complete radially outer annular main portion 211, and this diaphragm spring further includes radially inwardly extending hairpin-shaped alternating tongues 213 and prongs 230 each of which is of one piece with the radially innermost part or zone of the main portion 211. The illustrated diaphragm spring 204 comprises six tongues 213 and six prongs 230; however, it will be appreciated that the number of the prongs 230 and/or tongues 213 can exceed or can be less than six. It is also possible to place two, three or more prongs 230 between each pair of tongues 213 or vice versa. Moreover, the number of prongs 230 between each pair of tongues 213 need not be the same, and this also applies for the numbers of tongues 213 between pairs of neighboring prongs 230.

Figure 7:
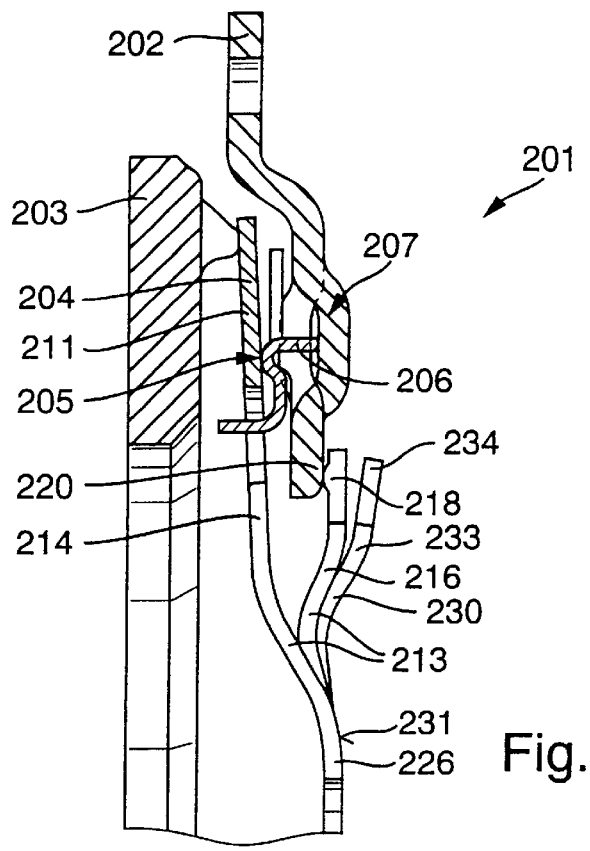
FIG. 7 is a fragmentary axial sectional view of a friction clutch employing the diaphragm spring of FIG. 6.

The friction clutch 201 of FIG. 7 employs a diaphragm spring 204 of the type shown in FIG. 6. In all or nearly all other respects, the operation of the clutch 201 corresponds to that of the friction clutch 1 shown in FIGS. 1 and 2.

The radially innermost portions 226 of the tongues 213 and the radially inner portions 231 of the prongs 230 are located at the same radial distance, or close to the same radial distance, from the axis X—X of the friction clutch 201 and its housing 202. Moreover, the portions 226, 231 are located in or close to a common plane which is normal to the axis X—X. This enables the clutch disengaging bearing (indicated at 215a) to engage the portions 226 as well as the portions 231 during axial movement in a direction to disengage the clutch 201, i.e., to push the portions 226, 231 in a direction to the left (as viewed in FIG. 7) and to thus pivot the annular main portion 211 of the diaphagm spring toward the rear wall 202a of the housing 202, which enables the pressure plate 203 to move away from the counterpressure plate and to thus at least partially disengage the friction clutch 201.

The tongues 213 include radially inwardly extending portions 214, and the prongs 230 include similar or identical (analogous) radially inwardly extending portions 232. The portions 214 are of one piece with radialy outwardly extending portions 216 of the respective tongues 213, and the portions 232 are of one piece with radially outwardly extending portions 233 of the respective prongs 230. When the diaphragm spring 204 is properly installed in the housing 202, the free radially outer ends 218 of the portions 216 bear against the exposed surface of the rear wall 202a but the free radially outer ends 233 of the portions 232 are spaced apart from the wall 202a. The tongues 213 are sufficiently stressed to ensure that the free ends 218 urge the annular main portion 211 against the element 206 of the wear compensating unit 207. At such time, the free ends 218 bear against the adjacent ramps 220 at the exposed surface of the rear wall 202a. As in the embodiment of FIG. 2, the element 206 forms part of a seat 205 for the diaphragm spring 204 as well as a constituent of the wear compensating unit 207.

FIG. 6 shows that the width of the free ends 234 (as seen in the circumferential direction of the annular main portion 211) is less than the width of the free ends 218. As already mentioned hereinbefore, the lateral portions of the free ends 218 can be twisted or chamfered in the same way as described in connection with FIG. 5 for the end portions 118 of the tongues 113 forming part of the diaphragm spring 104. The same applies for the free ends 234, i.e., they, too, can be designed in a manner as shown in FIG. 5 for the end portions 118. Though the ends 234 are not in permanent contact with the housing 202, they do engage the exposed surface of the wall 202a when the clutch 201 is being disengaged by the bearing 215a. Such engagement between the ends 234 and the ramps 220 takes place with a certain delay following initial displacement of the ends 234 by the bearing 215a.

An advantage of multistage engagement of the diaphragm spring 204 with the wall 202a is that the resultant or final (maximal) clutch disengaging force is arrived at in a stepwise fashion; this reduces the likelihood of excessive tilting of the diaphragm spring 204 and enhances the predictability of functioning of the wear compensating unit 207.

It is preferred to select the inclination of the radial portions 233 and the initial axial positions of the free ends 234 of the tongues 213 in such a way that the free ends 234 engage the ramps 220 of the rear wall 202a only when the pressure plate 203 has already released the adjacent friction linings of the clutch disc, i.e., when the friction clutch 201 is already disengaged. This ensures that the application of a greater force to the bearing 215a (in order to continue a tilting of the diaphragm spring 204) is required only when the clutch 201 is already disengaged. It is also possible to select the orientation of the free ends 234 in such a way that they engage the ramps 220 of the rear wall 202a shortly before the friction clutch 201 is fully disengaged, i.e., when the friction surface of the pressure plate 203 is about to become disengaged from the adjacent friction linings (such as those shown at 803 in FIG. 16) of the clutch disc.

The portions 233 of the prongs 230 ensure that, at least when the disengagement of the friction clutch 201 is completed, as well as when the tilting of the diaphragm spring 204 is continued upon completion of the clutch disengaging operation, the disengaging force acting upon the radially innermost portions 226, 231 of the tongues 213 and prongs 230 is below that (resultant) force which acts upon the diaphragm spring 204 in the direction of the axis X—X and urges the diaphragm spring toward the rear wall 202a of the housing 202. This is desirable and advantageous because the resultant force ensures that the annular element 206 remains clamped between the rear wall 202a and the diaphragm spring 204. The force which the portions 233 of the prongs 230 apply to the diaphragm spring 204 acts in parallel with the axial force being applied by the tongues 213.

The purpose and the functions of the prongs 230 are analogous to those of the prongs forming part of a diaphragm spring utilized in a somewhat similar but not identical friction clutch disclosed in the aforementioned published German patent application Ser. No. 197 07 785. Reference may be bad to the structure shown in FIG. 3 of this published patent application and of corresponding patents and patent applications granted and filed in countries other than Federal Republic Germany.

Figure 8:
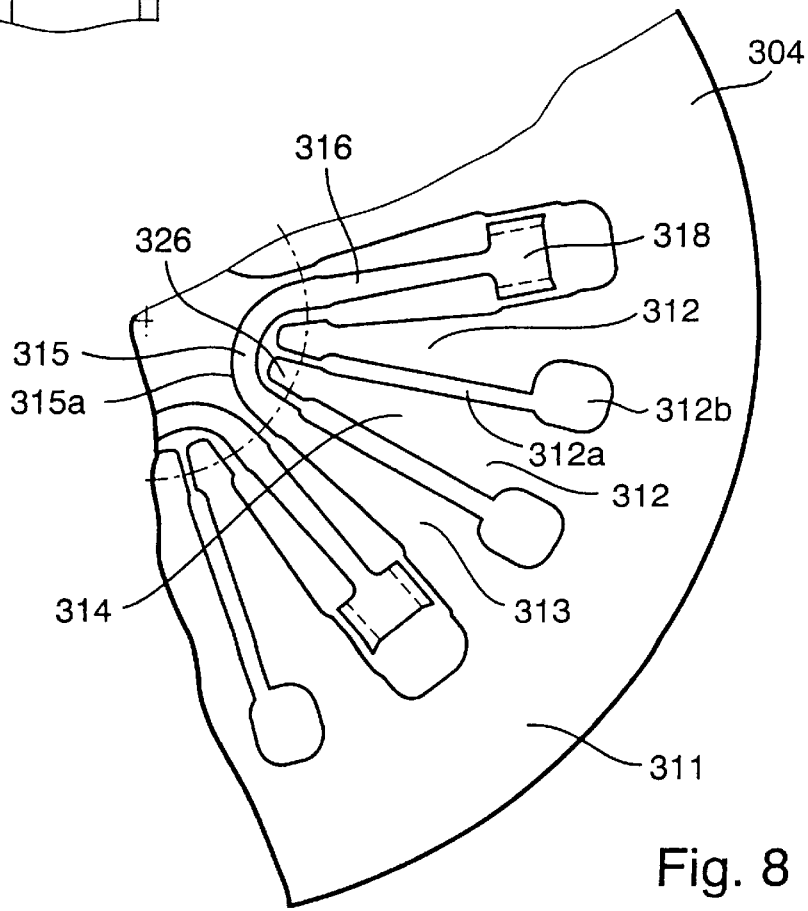
FIG. 8 is a fragmentary elevational view of a further diaphragm spring.

FIG. 8 shows a portion of a diaphragm spring 304 which constitutes a further modification of the diaphragm spring 4. The circumferentially complete radially outer main portion 311 of the spring 304 carries a set of six (only three shown) hairpin-shaped tongues 313 having radially extending portions 314, 316 flanking pairs of prongs 312. The radially innermost (third) portions 315 of the tongues 313 extend beyond the radially innermost portions of the prongs 312, and the diameter of the disengaging bearing 315a is selected in such a way that this bearing can engage and displace the end portions 315 as well as the end portions 326 when the friction clutch employing the diaphragm spring 304 is being disengaged.

The pairs of prongs 312 within the confines of the respective tongues 313 are separated from each other by radially extending slots 312a, and the radially outermost portions of these slots are enlarged, as at 312b. The enlarged free radially outer ends 318 of the radially outwardly extending (second) portions 316 of the tongues 313 are received with some lateral play in the relatively wide radially extending slots 316a of the diaphragm spring 304.

It is possible to design the diaphragm spring 304 in such a way that the portions 314, 316 of each tongue 313 flank a single prong 312 or three or more prongs. Furthermore, the number of prongs 312 within the confines of each of the tongues 313 may but need not be the same.

An advantage of the diaphragm spring 304 is that the overall length of its tongues 313 (and hence their flexibility=ability of the free ends 318 to move in the axial direction of the friction clutch employing the diaphragm spring 304) is greater than that of, for example, the tongues 213. This reduces the likelihood of concentration of pronounced stresses in discrete portions of the tongues 313. For example, such dimensioning of the tongues 313 reduces the development of excessive stresses in the regions where the radially innermost portions 315 of the tongues 313 are repeatedly engaged by the disengaging bearing 315a. The feature that the design (dimensioning) of the tongues 313 reduces the likelihood of the development of pronounced localized stresses contributes to longer useful life of the diaphragm spring 304 because the tongues 313 are much less likely to break than standard tongues.

The diaphragm spring 304 can be mass produced in a stamping, trimming (cutting) or other suitable machine which is preferably designed to finish the outlines of the main portion 311, tongues 313 and prongs 312 in a simultaneous operation.

The radially innermost portions 326 of the prongs 312 are or can be offset relative to the radially innermost portions 315 of the tongues 313 in the axial direction of the friction clutch which employs the diaphragm spring 304. This enhances the reliability of the clutch disengaging operation because the disengaging bearing 315a can properly engage the inner ends of the tongues as well as the inner ends of the prongs. Furthermore, such axial offset of the end portions 315 and 326 relative to each other ensures that the disengaging bearing cannot adversely affect the elasticity of the tongues 313.

That surface of the bearing 315a which engages the radially inner end portions 315 and 326 of the tongues 313 and prongs 312 (the bearing normally rotates with the diaphragm spring 304) can be provided with recesses in the form of grooves, sockets or the like which register with the end portions 315. This renders it possible to dispense with the aforementioned axial offset of the end portions 315, 326 relative to each other because the suitably configurated active surface of the bearing 315a can engage the end portions 326 but not the end portions 315. In such diaphragm springs, the end portions 315 can be coplanar or at least substantially coplanar with the end portions 326.

Figure 9:
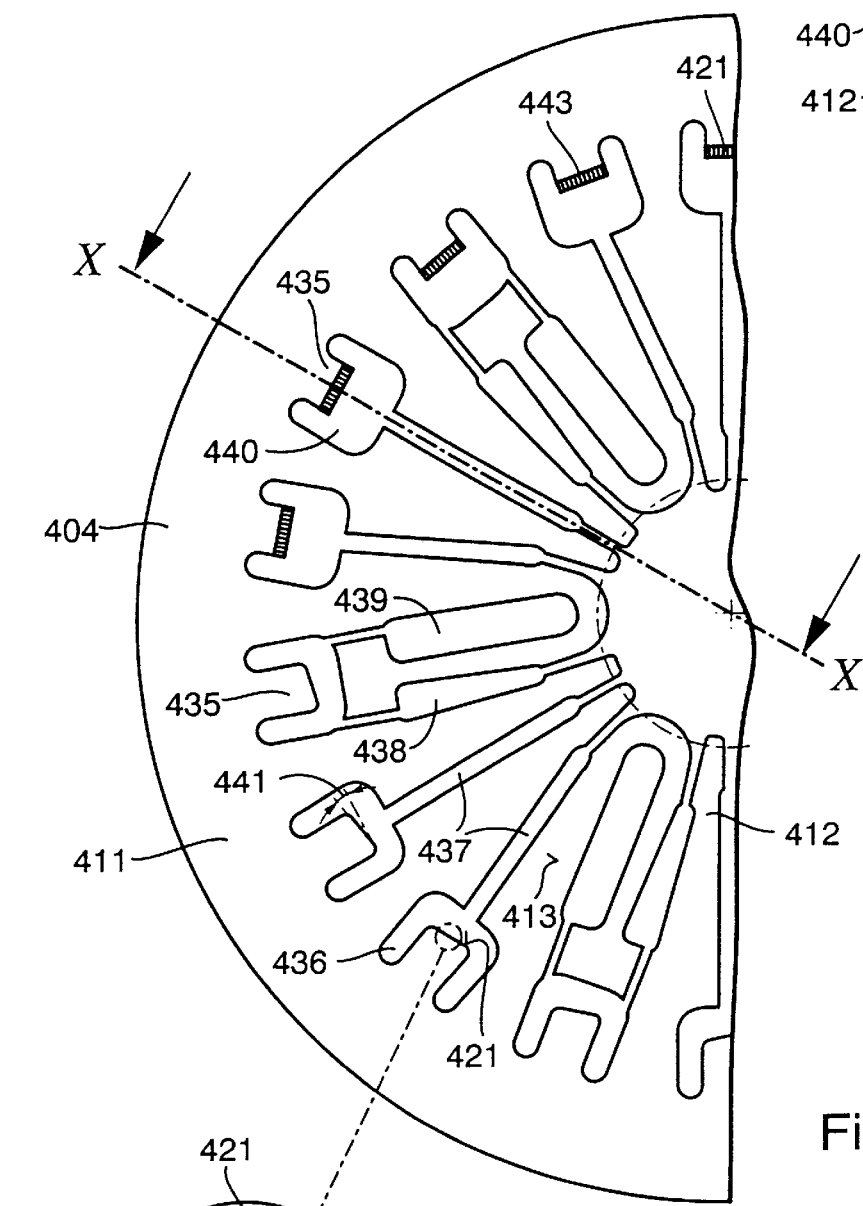
FIG. 9 is a fragmentary elevational view of still another diaphragm spring.
Figure 11:
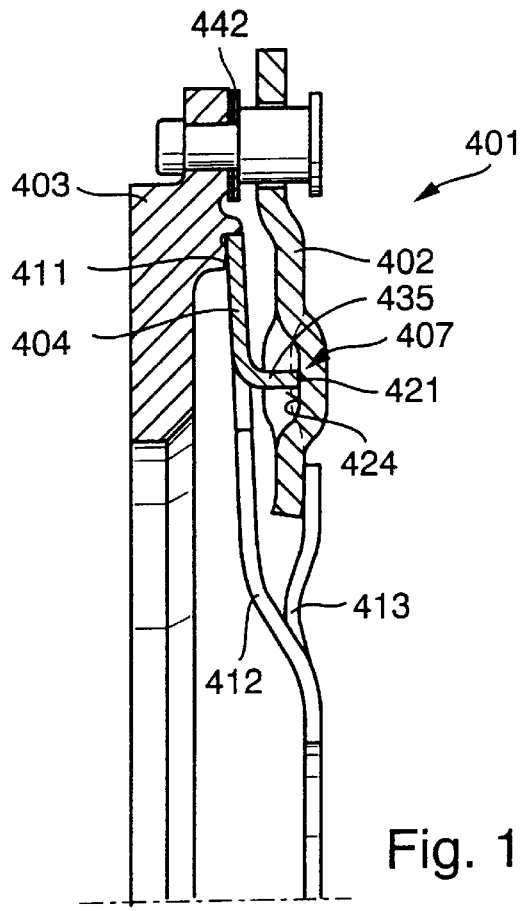
FIG. 11 is a fragmentary axial sectional view of a friction clutch which embodies a diaphragm spring of the character shown in FIGS. 9, 9a and 10.

The diaphragm spring 404 of FIG. 9 is designed for use in the friction clutch 401 of FIG. 11. This spring includes an energy storing component constituted by the circumferentially complete radially outermost portion 411, and hairpin-shaped tongues 413 alternating with pairs of prongs 412. The radially outermost portions of the tongues 413 and prongs 412 are of one piece with the radially innermost part or zone of the annular main portion 411. The prongs 412 are resiliently deformable in the direction of the axis X—X of the friction clutch 401. As concerns the advantages of the configuration, dimensions, distribution and axial positioning of the prongs 412 and tongues 413, reference may be had, at least in part, to the preceding description of the embodiments shown in FIGS. 1 to 8. It will be noted that the prongs 412 and the tongues 413 respectively resemble the parts 12 and 13 of the diaphragm spring 4 shown in FIG. 1.

The diaphragm spring 404 of FIG. 9 comprises projections 435 in the form of lugs which are provided radially outwardly of the free ends 418 of the tongues 413 and radially outwardly of the radial slots 437, and are of one piece with the annular main portion 411. As can be seen in FIG. 11, when the diaphragm spring 404 is installed in the housing 402 of the friction clutch 401, the lugs 435 extend in the direction of the axis X—X, i.e., at last substantially at right angles to the general plane of the spring 404 (such plane is at least substantially perpendicular to the axis X—X). The bent-over lugs 435 (see the five uper lugs of FIG. 9) extend substantially tangentially or circumferentially of the annular main portion 411, and their free ends 421 constitute ramps cooperating with circumferentially extending ramps 424 at the inner side of the rear wall 402*a* of the housing 402. The ramps 421 extend in the circumferential direction of the main portion 411 and slope in the direction of the axis X—X, the same as the complementary ramps 424 of the wall 402*a*.

It will be noted that the lugs 435 and their ramps 421 perform the function of the annular element 6 of the wear compensating unit 7 in the friction clutch 1 of FIG. 2. Thus, the feature that the ramps 421 are of one piece with the diaphragm spring 404 contributes significantly to simplicity, lower cost and compactness of the friction clutch 401.

The lugs 435 can be formed simultaneously with the conversion of a metallic (e.g., spring steel) blank into the diaphragm spring 404 in a suitable stamping, trimming or analogous machine. Prior to their bending from the plane of the annular main portion 411, the lugs 435 extend radially inwardly (see the five lugs 435 in the lower half of FIG. 9) and are surrounded by U-shaped cutouts 436. The parallel legs of such cutouts extend radially outwardly and flank the respective lugs 435, and the webs of the cutouts 436 extend in the circumferential direction of the main portion 411. The webs of certain U-shaped cutouts 436 communicate with the radially outer ends of the aforementioned radially extending slots 437.

The webs of the remaining U-shaped cutouts 436 communicate with the radially outer ends of radially extending pairs of slots 438, 439 which are disposed between pairs of neighboring prongs 412 and flank the (second) portions 416 of the hairpin-shaped tongues 413.

FIG. 9 shows that the radially innermost portions of the slots 437, 438 and 439 are narrower than their major portions. In addition, the radially outer portions of the slots 438, 439 are also narrowed due to the selected widths of the free ends 418 of the radially extending (second) portions 416 of the tongues 413.

The radially outermost portions of the slots 437 are widened (enlarged in the circumferential direction of the annular main portion 411) to thus ensure that the dimensions of the respective lugs 435 will suffice to form ramps 421 of requisite length. The same holds true for the dimensions of the composite slots including the pairs of slots 438, 439, i.e., the length of the ramps 421 defined by the lugs 435 confronting the free ends 418 can match the length of all other ramps 421.

The reference character 441 (reference should be had to the lower part of FIG. 9) denotes the angle of slope of a finished ramp 421, i.e., of the free end of a lug 435 which has been bent from the plane of the annular main portion 411 and extends in at least substantial parallelism with the axis X—X when the finished diaphragm spring 404 is properly mounted in the housing 402 of the friction clutch 401. The ramps 421 of the properly oriented lugs 435 cooperate with the ramps 424 at the inner side of the rear wall 402*a* of the housing 402. Such cooperation between the ramps 424 of the rear wall 402*a* and the ramps 421 of the diaphragm spring 404 renders it possible to achieve a pronounced simplification of the wear compensating unit 407 in the friction clutch 401 of FIG. 11.

Figure 10:
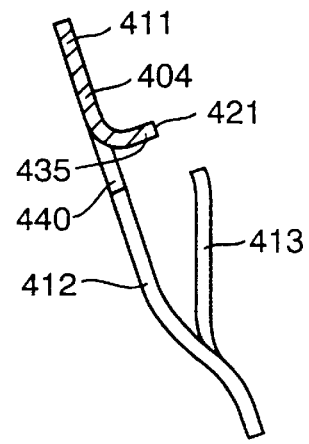
FIG. 10 is a fragmentary sectional view substantially as seen in the direction of arrows from the line X—X in FIG. 9.

It is clear that the making of ramps (421) directly on the diaphragm spring (404) is not limited to the embodiment which is shown in FIGS. 9 to 11 and wherein the diaphragm spring 404 is of one piece with tongues 413 which cooperate with the outer side of the rear wall 402*a* to urge the ramps 421 against the ramps 424. Thus, the tongues 413 can be omitted and the ramps 421 of a diaphragm spring embodying such ramps can be biased against the ramps 424 by one or more discrete resilient elements, e.g., by resilient sensors of the type shown at 811 in FIG. 17. The discrete resilient element(s) can bear directly upon a diaphragm spring having a set of ramps (such as 421) or indirectly (e.g., in a manner as shown in FIG. 23 of U.S. Pat. No. 5,450,934).

Figure 12:
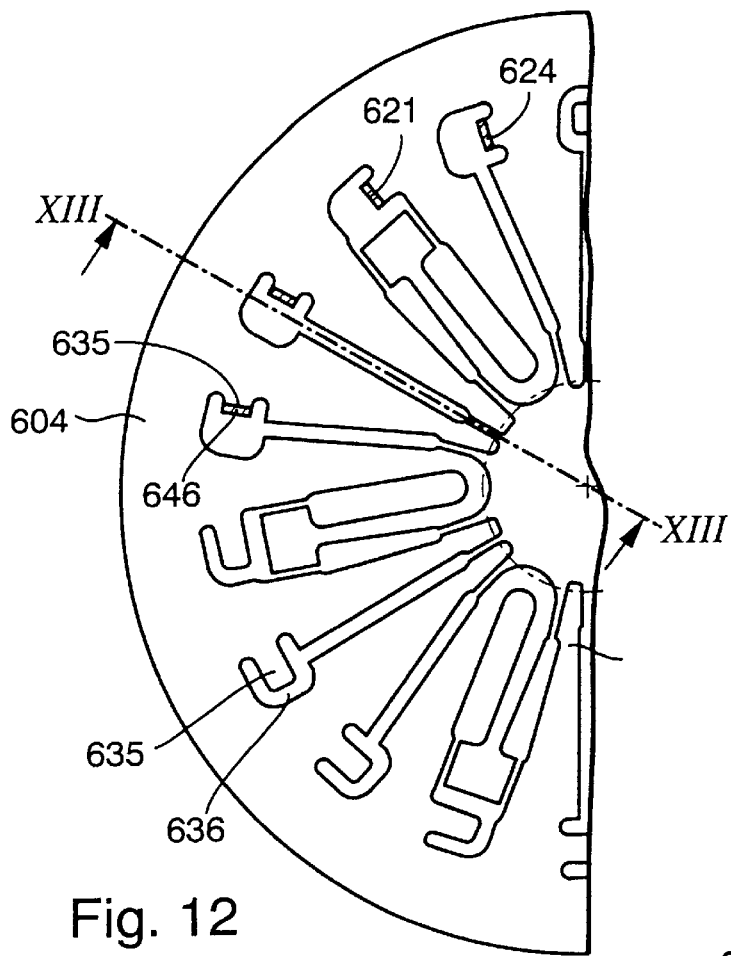
FIG. 12 is a fragmentary elevational view of a diaphragm spring which embodies still another form of the present invention.
Figure 13:
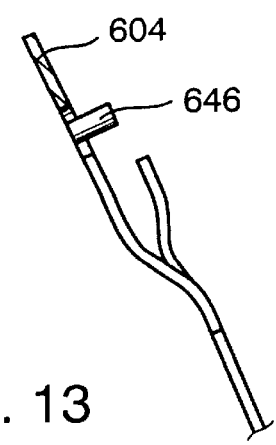
FIG. 13 is a fragmentary sectional view substantially as seen in the direction of arrows from the line XIII—XIII in FIG. 12.

It goes without saying that the wear compensating unit 407 can further comprise means (such as coil springs of the type shown in FIGS. 12 and 13 of U.S. Pat. No. 5,450,934 and at 813 in FIG. 16 of the present specification) for turning the diaphragm spring 404 relative to the housing 402 in order to carry out an axial adjustment of the diaphragm spring and to thus compensate for wear at least upon the friction linings of the clutch disc. As a rule, the wear compensating unit 407 will employ a set of coil springs which act in the circumferential direction of the main portion, namely they react against the rear wall 402*a* and bear upon the diaphragm spring 404 to change the angular (and hence also 10 the axial) position of the diaphragm spring whenever warranted in view of the extent of initial wear (or the extent of wear following the last adjustment) to be compensated for by the unit 407.

FIG. 11 shows one of several leaf springs 442 which couple the pressure plate 403 to the housing 402 so that the pressure plate rotates with but has the necessary freedom of (limited) movement in the direction of the axis X—X. The leaf springs 442 are normally prestressed so that they urge the pressure plate 403 axially against the diaphragm spring 404 and thus urge the ramps 421 against the ramps 424. If the tongues 413 are omitted, the leaf springs 442 can constitute the sole means for biasing the ramps 421 of the lugs 435 on the diaphragm spring 404 against the ramps 424 of the rear wall 402*a* of the cover 402. Reference may be had to the published German patent application Ser. No. 197 54 537.

Figure 9A:
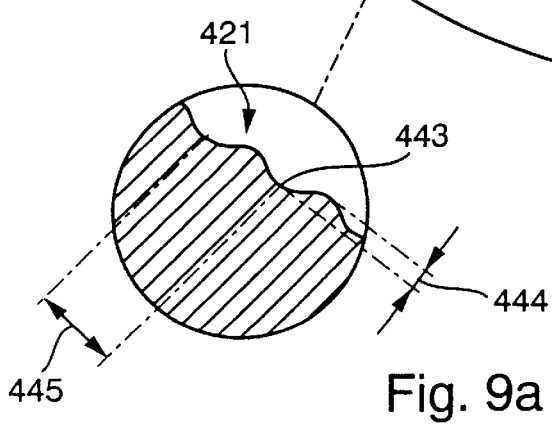
FIG. 9a is an enlarged view of a detail in the diaphragm spring which is shown in FIG. 9.

As can be seen in the upper half of FIG. 9, and particularly in FIG. 9*a*, the ramps 421 of the lugs 435 on the diaphragm spring 404 can be provided with grooves, channels and/or ribs 443 which extend substantially radially of the axis X—X when the diaphragm spring 404 is installed in the housing 402. Similar unevennesses can be provided on or only on the ramps 424 of the rear wall 402*a*. A ramp 421 or 424 which is provided with the unevennesses 443 and/or analogous configurations can be said to constitute a toothed rack. The depth 444 of the recesses or grooves at the ramps 421 and/or 424 can be in the range of between about 0.1 and 0.5 mm, preferably between about 0.15 and 0.3 mm. The distances 445 between the deepmost portions of neighboring grooves or recesses in the ramps 421 and/or 424 can be in the range of between about 0.5 and 3 mm, especially between about 0.8 and 1.5 mm.

Figure 11A:
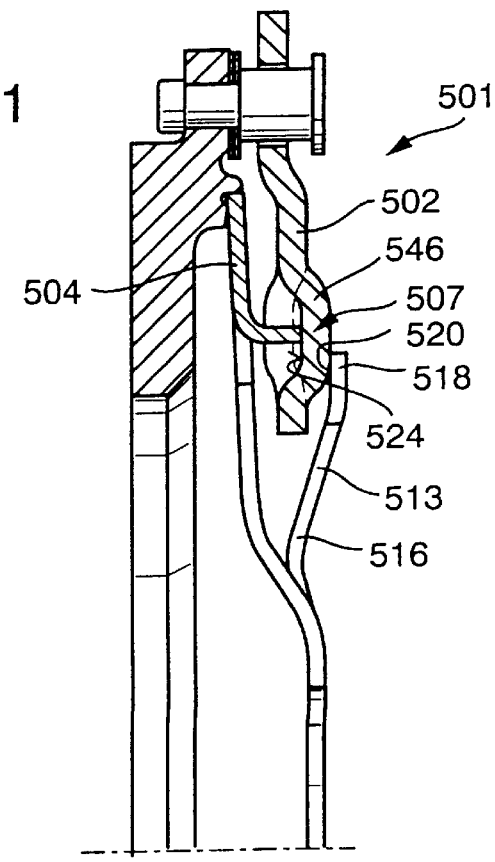
FIG. 11a is a fragmentary axial sectional view of a friction clutch constituting a modification of the friction clutch shown in FIG. 11.

FIG. 11*a* shows a portion of a friction clutch 501 wherein the diaphragm spring 504 departs from the diaphragm spring 404 of FIG. 9 in that its tongues 513 have free ends 518 abutting directly the ramps 520 on the rear wall 502*a* of the housing 502. The ramps 520 are defined by shaped portions or extensions 546 of the rear wall 502*a*. The extensions 546 further define the ramps 524 for the complementary ramps 521 on the bent-over lugs 535 of the diaphragm spring 504. This amounts to a further simplification of the automatic wear compensating unit 507.

The ramps 520, 524 are located at opposite sides of the extensions 546 forming part of or provided on the rear wall 502*a*. All that is necessary to arrive at the structure of FIG.

11a is to lengthen (and, if necessary, change the configuration of) the (second) portions 516 of the tongues 513 radially outwardly (as compared with the length of the portions 416 shown in FIGS. 9 and 11).

Figure 14:
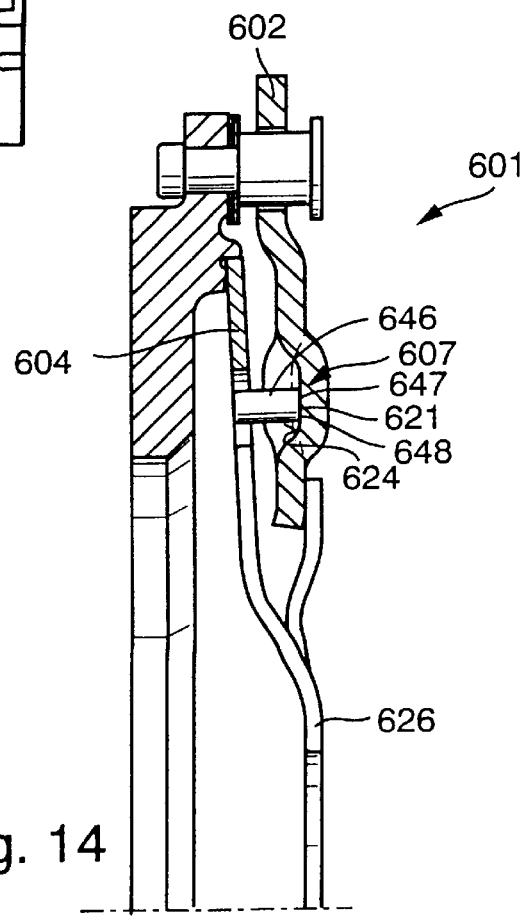
FIG. 14 is a fragmentary axial sectional view of a friction clutch which employs the diaphragm spring of FIGS. 12 and 13.

FIG. 12 shows a portion of a diaphragm spring 604 which can be utilized in the friction clutch 601 of FIG. 14. A difference between the diaphragm spring 604 and the diaphragm spring 404 of FIG. 9 is that the planes of the bent-over lugs 635 of the diaphragm spring 604 extend at least substantially radially of the axis X—X. The free ends or ramps 621 of such lugs cooperate with the ramps 624 at the inner side of the rear wall 602a forming part of the housing 602 of the friction clutch 601. Thus, the automatic wear compensating unit 607 of the friction clutch 601 basically comprises the lugs 635, the ramps 624 and the non-illustrated springs which turn the diaphragm spring 604 relative to the housing 602 when warranted by the extent of (initial or renewed=additional) wear upon the friction linings of the clutch disc.

The lower half of FIG. 12 shows that the lugs 635 are initially located in the plane of the annular main portion 611 of the diaphragm spring 604, and the upper half of FIG. 12 shows the portions 646 of the lugs 635 subsequent to bending to extend in the direction of the axis X—X when the thus finished diaphragm spring 604 is installed in the housing 602.

The U-shaped cutouts 636 which surround the lugs 635 prior to the bending or deforming step have substantially parallel legs extending circumferentially of the main portion 611 and two thirds of these cutouts communicate with radially extending slots 638. The ramps 621 at the free ends of the bent portions 646 of the lugs 635 can slope axially to cooperate with the complementary ramps 624 of the rear wall 602a. The slope of the ramps 624 can but need no be identical with that of the ramps 621.

Furthermore, the ramps 621 and/or 624 can be designed to exhibit a convex or otherwise curved outline (as seen in the radial direction of the diaphragm spring 604), depending on the desired or required extent of frictional engagement between or sliding movement of the two sets of ramps relative to each other.

It is also possible to configure the ramps 621 and/or 624 (as seen in the radial direction of the diaphragm spring 604) in such a way that, when the clutch 601 is actuated, the areas of contact between the two sets of ramps are caused to move radially of the axis X—X. For example, when the clutch 601 is disengaged, the point or region of contact between the ramps 621, 624 can be located at the radially outer or outermost parts 647 of the ramps 621. When the clutch 601 is engaged, such points or regions of contact are located at the radially inner or innermost parts 648 of the ramps 621. Such design causes the diaphragm spring 604 to change its lever arm, and this can be relied upon to reduce the magnitude and/or the progress of the force which is required to disengage the friction clutch 601.

As a rule, it is of advantage if at least those portions of the rear walls of the clutch housings which are contacted by the tongues and/or prongs 13, 113, 213, 230, 313, 413, 513, 613 (which slide or roll relative to the respective rear walls during certain stages of operation of the corresponding friction clutches) are rendered wear resistant. This can be accomplished in a number of different ways. For example, at least certain portions of the clutch housing can be hardened and/or coated with one or more layers or films or liners of wear-resistant material. The layers can consist of hard nickel, phosphate and/or of other suitable materials.

It is often sufficient to coat certain abutting (contacting) and relatively movable portions of the rear wall of the housing and/or of the diaphragm spring with thin layers or films of temperature-resistant grease. Still further, it is possible to employ separately produced hard or hardened inserts which are placed between the otherwise contacting portions of those parts of the improved friction clutch or its wear compensating unit which would undergo excessive and premature wear in the absence of any udertakings to the contrary. For example, one can resort to annular washer-like or tubular inserts. In fact, it is equally possible to select the dimensions of a bard or hardened insert in such a way that it can be provided with one or two sets of ramps. For example, an annular insert can be employed to carry ramps which are shown as being provided on the rear wall of the housing of the improved friction clutch.

One of the presently preferred procedures which can be resorted to in order to avoid excessive or extensive wear upon the parts of the wear compensating unit is to nickelize (particularly cold nickelize in the absence of current) those parts which are subject to wear and could affect the accuracy of the wear compensating action. For example, it is possible to nickelize the entire housing or at least the entire rear wall of the housing; this automatically shields the ramps (such as 624) on the rear wall (602a) against excessive or even pronounced wear and/or corrosion. The above enumerated are but a few examples of procedures which can be resorted to in order to shield the wear- and/or corrosion-sensitive constituents of the wear compensating unit and to thus ensure a predictable and optimum compensation for wear at least upon the friction linings of the clutch disc during the entire useful life of the improved friction clutch.

The just discussed and other expedients of shielding the ramps against excessive corrosion and/or wear can be resorted to in each and every embodiment of the improved friction clutch; e.g., it is possible to enhance the wear resistance of the annular element 6 in the friction clutch 1 and/or of the undulate (uneven) surfaces of the ramps 421. Furthermore, and if one set (such as 421) of ramps is provided on the diaphragm spring (404), it is often advisable to treat the entire diaphragm spring in a hardening machine, in a nickelizing machine and/or in any other suitable way.

Still further, it is advisable to treat certain other parts of the improved friction clutch, e.g., the free ends 18 of (second) portions 16 of the tongues 13, the free ends 118, 218, 234, 318 and/or 518 in a manner and for the purpose of at least enhancing their resistance to wear.

An advantage of diaphragm springs (such as 404, 504 and 604) which are of one piece with one set of ramps (i.e., which form part of the wear compensating unit) is that the active surfaces of their ramps can be provided with desired optimum (such as uneven including grooved, ribbed, etc.) configurations during the making of the diaphragm springs. The lugs (such as 435) are thereupon simply bent out of the general plane of the respective main portion (such as 411), and the diaphragm spring is ready for insertion into the housing of the friction clutch.

It is also possible to provide ramps (such as 421) directly on the blank which is thereupon converted into a diaphragm spring, i.e., to dispense with the formation and bending of the lugs 435, 535 or 635. This brings about a further simplification of the clutch. An advantage of the lugs is that the wear upon their end faces (such as the end faces of the lugs 435) is negligible in comparison with the dimensions of the bent-over lugs in the axial direction of the friction clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction clutches with automatic compensation for wear and, therefore, such adaptations should and are intended to be comprehended within the meaning and range of equivalence of the appended claims.

What is claimed is:

1. For use in a power train, a friction clutch which is subject to wear and compromises;
   a housing having a wall and being rotatable about an axis;
   a pressure plate rotatable with and having limited freedom of axial movement relative to said housing;
   at least one diaphragm spring disposed between said wall and said pressure plate, arranged to bias said pressure plate axially of said housing and away from said wall with a force which tends to vary as a function of the extent of wear upon the friction clutch, said at least one diaphragm spring including an annular portion spaced apart from said axis and prongs extending from said annular portion toward said axis; and
   means for compensating for wear upon the friction clutch by maintaining said diaphragm spring at an at least substantially constant stress condition, including means for moving said at least one diaphragm spring in the direction of said axis from said wall toward said pressure plate, said moving means including a substantially annular array of ramps carried by and extending in a circumferential direction of said housing, and a plurality of portions forming part of said at least one diaphragm spring, each portion cooperating with at least one of said ramps, wherein at least in the engaged condition of the friction clutch, the biasing force generated by the diaphragm spring is transmitted to the housing by said portions.

2. The friction clutch of claim 1, wherein said portions of said diaphragm spring extend at least substantially axially of said housing.

3. The clutch of claim 1, wherein said annular portion of said at least one diaphragm spring includes a radially innermost marginal part nearest to said axis and said portions of said diaphragm spring are at least close to said marginal part.

4. The friction clutch of claim 1, wherein said prongs include pairs of neighboring prongs and said portions are disposed at said pairs of neighboring prongs.

5. The friction clutch of claim 4, wherein said portions are disposed between the prongs of the respective pairs as seen in said circumferential direction of said housing.

6. The friction clutch of claim 1, wherein said at least one diaphragm spring has slots between said prongs, at least some of said slots having radially inner portions nearer to and enlarged radially outer portions more distant from said axis.

7. The friction clutch of claim 6, wherein each of said portions of said diaphragm spring is adjacent a different one of said enlarged radially outer portions of said slots, said annular portion of said at least one diaphragm spring being disposed in a plane which is at least substantially normal to said axis and said portions of said diaphragm spring constituting deformed parts of said at least one diaphragm spring bent out of said plane to extend at least substantially in the direction of said axis.

8. The friction clutch of claim 7, wherein said portions of said diaphragm spring extend substantially tangentially of the enlarged radially outer portions of the respective slots.

9. The friction clutch of claim 7, wherein said portions of said diaphragm spring extend substantially radially of the enlarged radially outer portions of the respective slots.

10. The friction clutch of claim 1, wherein said ramps have a first set of surfaces and said portions have a second set of surfaces abutting the respective surfaces of the first set, said abutting surfaces of said ramps and portions constituting pairs of surfaces and at least one surface of each pair constituting an at least partially uneven surface.

11. The friction clutch of claim 1, further comprising means for urging said portions against the respective ramps.

12. The friction clutch of claim 11, wherein said means for urging includes stressed resilient tongues forming part of said at least one diaphragm spring and reacting against said housing.

13. The friction clutch of claim 12, wherein said annular portion of said at least one diaphragm spring is resilient and said tongues include first portions extending from said annular portion toward said axis, second portions extending in a direction from said axis toward said annular portion, and third portions connecting said first and second portions of the respective tongues and being spaced apart from said annular portion.

14. The friction clutch of claim 13, wherein said first and second portions of said tongues have ends adjacent to but spaced apart from said axis, said third portions of said tongues being of one piece with the ends of the first and second portions of the respective tongues.

15. The friction clutch of claim 12, wherein said tongues resemble hairpins.

16. The friction clutch of claim 12, further comprising actuating means for engaging and disengaging the clutch, said actuating means including at least one of said resilient prongs and said resilient tongues.

17. The friction clutch of claim 16, wherein said tongues extend from said annular portion of said at least one diaphragm spring toward said axis.

18. The friction clutch of claim 1, wherein said pressure plate is engageable with and disengageable from a clutch disc and said prongs are stressed and resemble hairpins and react against said housing and extend from a radially inner marginal portion of said annular portion of said at least one diaphragm spring, said at least one diaphragm spring further comprising substantially hairpin-shaped tongues extending from said inner marginal portion of said annular portion of said at least one diaphragm spring and reacting against said housing only during disengagement of said pressure plate from said clutch disc.

19. The friction clutch of claim 18, further comprising means for disengaging the clutch including means for moving portions of at least one of (a) said prongs and (b) said tongues in the axial direction of said housing.

20. The friction clutch of claim 18, further comprising means for disengaging said pressure plate from said clutch disc, at least one of (a) said prongs and (b) said tongues forming part of said disengaging means.

21. The friction clutch of claim 1, wherein said prongs resemble hairpins and said at least one diaphragm spring further comprises hairpin-shaped tongues of one piece with and extending substantially radially inwardly from a radially inner marginal portion of said annular portion.

22. The friction clutch of claim 1, wherein said annular portion of said at least one diaphragm spring is confined in said housing in a prestressed condition and includes a radially inner marginal portion of one piece with said prongs, said at least one diaphragm spring further comprising substantially hairpin-shaped tongues having pairs of portions extending substantially radially of said annular portion, at least one of said prongs being disposed between said substantially radially extending portions of each of said tongues.

23. For use in a power train, a friction clutch which is subject to wear and comprises:
- a housing having a wall and being rotatable about a predetermined axis;
- a pressure plate rotatable with and having limited freedom of axial movement relative to said housing;
- at least one diaphragm spring disposed between said wall and said pressure plate and being arranged to bias said pressure plate axially of said housing and away from said wall with a force which tends to vary as a function of the extent of wear upon the friction clutch, said at least one diaphragm spring including an energy storing device having an annular portion spaced apart from said axis, prongs extending from said annular portion toward said axis, and prestressed hairpin-shaped tongues forming part of said annular portion and arranged to bias said at least one diaphragm spring against said housing, said tongues having pairs of portions spaced apart from each other in a circumferential direction of said housing and at least one of said prongs being disposed between said pairs of spaced-apart portions of at least some of said tongues; and
- means for compensating for wear upon the friction clutch by maintaining said diaphragm spring at an at least substantially constant stress condition including means for moving said at least one diaphragm spring in the direction of said axis from said wall toward said pressure plate.

24. For use in a power train, an engageable and disengageable friction clutch which is subject to wear and comprises:
- a housing having a wall and being rotatable about a predetermined axis;
- a pressure plate rotatable with and having limited freedom of axial movement relative to said housing;
- at least one diaphragm spring disposed between said wall and said pressure plate and being arranged to bias said pressure plate axially of said housing and away from said wall with a force which tends to vary as a function of the extent of wear upon the friction clutch, said at least one diaphragm spring including an annular portion spaced apart from said axis and having a radially inner marginal portion, prestressed hairpin-shaped resilient prongs extending from said annular portion toward said axis and permanently reacting against said housing, and hairpin-shaped tongues forming part of said annular portion, extending from said marginal portion, radially inwardly toward said axis and arranged to bias said at least one diaphragm spring against said housing during disengagement of the friction clutch; and
- means for compensating for wear upon the friction clutch by maintaining said diaphragm spring at an at least substantially constant stress condition, including means for moving said at least one diaphragm spring in the direction of said axis from said wall toward said pressure plate.

25. The friction clutch of claim 1, wherein said portions form a substantially annular array of second ramps.

* * * * *